(12) United States Patent
Fujieda

(10) Patent No.: US 6,885,367 B1
(45) Date of Patent: Apr. 26, 2005

(54) THREE-DIMENSIONAL MODEL MANAGEMENT SYSTEM

(75) Inventor: Makoto Fujieda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 586 days.

(21) Appl. No.: 09/690,812

(22) Filed: Oct. 18, 2000

(30) Foreign Application Priority Data

Nov. 26, 1999 (JP) .......................................... 11-336195

(51) Int. Cl.[7] .......................................... G06T 17/00
(52) U.S. Cl. .................................................... 345/420
(58) Field of Search .............................. 345/420, 418, 345/419, 581, 440, 619; 717/105

(56) References Cited

U.S. PATENT DOCUMENTS

| | | | | |
|---|---|---|---|---|
| 5,272,642 A | * | 12/1993 | Suzuki ........................ | 700/182 |
| 5,555,354 A | * | 9/1996 | Strasnick et al. ........... | 345/427 |
| 5,689,711 A | * | 11/1997 | Bardasz et al. ............. | 717/105 |
| 5,828,377 A | * | 10/1998 | Muro et al. .................. | 345/420 |
| 6,137,499 A | * | 10/2000 | Tesler .......................... | 345/440 |
| 6,166,741 A | * | 12/2000 | Hemingway ................. | 345/420 |
| 6,301,579 B1 | * | 10/2001 | Becker ........................ | 707/102 |

* cited by examiner

*Primary Examiner*—Don Wong
*Assistant Examiner*—Huedung X. Cao
(74) *Attorney, Agent, or Firm*—Staas & Halsey LLP.

(57) ABSTRACT

A three-dimensional model management system wherein a hierarchical structure and data peculiar to a three-dimensional model created by three-dimensional CAD are excluded to display a configuration view screen showing a configuration close to that of an actual object. Attribute information acquiring unit of the three-dimensional model management system acquires part names, as attribute information, from a three-dimensional model stored in a storage device. Sorting unit sorts the acquired part names in accordance with a hierarchical structure which the three-dimensional model has. Display form setting unit makes settings such that, for example, dummy data which is used for the sake of convenience of design and has no substance is not displayed on screen. Editing unit edits the part names sorted by the sorting unit, in accordance with the settings made by the display form setting unit. Output unit supplies the part names edited by the editing unit to a display device to be displayed thereby.

15 Claims, 39 Drawing Sheets

| PART NAME | DISPLAY/NON-DISPLAY |
|---|---|
| MAP PART | DISPLAY |
| MOLD | DISPLAY |
| IN-PROCESS PART | DISPLAY |

FIG. 7

| Part Name | Part No. | Author | Creation Date | Reviser | Last Update Date |
|---|---|---|---|---|---|
| Link Bar | L15-12 | Toru NAKAMOTO | 99/12/10 | Kaoru TAKADA | 99/12/21 |

| Link Type | Storage Location | Internal Part Name | Material | Surface | Facet Error |
|---|---|---|---|---|---|
| Flat | A:/DATA | LNK-12 | Aluminum | 11 | $10^{-6}$ |

FIG. 24

| Part Name | Part No. | Author | Creation Date | Reviser | Last Update Date |
|---|---|---|---|---|---|
| Rear Cushion Cover | R14-13 | Toru NAKAMOTO | 99/12/10 | Kaoru TAKADA | 99/12/21 |

| Link Type | Storage Location | Internal Part Name | Material | Surface |
|---|---|---|---|---|
| Multi | A:/DATA3 | Rear Cushion Cover A | Urethane | 11 |

| Storage Location | Internal Part Name | Material | Surface | Facet Error |
|---|---|---|---|---|
| A:/DATA4 | Rear Cushion Cover B | Urethane | 11 | $10^{-6}$ |

FIG. 30

THREE-DIMENSIONAL MODEL MANAGEMENT SYSTEM

BACKGROUND OF THE INVENTION (1) Field of the Invention

The present invention relates to a three-dimensional model management system, and more particularly, to a three-dimensional model management system for managing three-dimensional models constituted by multiple parts.

(2) Description of the Related Art

With recent advance in three-dimensional CAD (Computer Aided Design), there has been an increasing tendency to produce necessary drawings, parts lists, etc. from three-dimensional models of products created beforehand on a computer.

Simultaneously, PDM (Product Data Management) has also been spreading in which all data relating to product development is managed in an integrated manner for effective use of data and higher efficiency of design work etc.

Recently, therefore, there is a growing tendency to harmonize three-dimensional CAD with PDM, thereby to make more practical use of data through the course of process from design to manufacture.

Meanwhile, parts defined in CAD and parts defined in PDM are often not in one-to-one correspondence. For example, when drawing a figure by CAD, a dummy part which actually does not exist is sometimes used in order to show the relationship of engagement between parts. Thus, if a parts list is created by PDM based on a three-dimensional model including such a dummy part, a problem arises in that an unnecessary part is also shown.

Also, data created by CAD often has a data structure specific to the CAD. For example, when drawing a part with a plurality of identical portions or segments, it is often the case that a segment is drawn, copied, and modified by rotation etc., to obtain a desired part by finally combining the segments. In such cases, however, since the segments are registered as separate parts, a problem arises in that there is no one-to-one correspondence between the contents of parts list and actual parts. One such specific example is shown in FIG. 35. The illustrated example is constituted by cylindrical parts a and c, and a regular hexahedron b. To draw a three-dimensional model like this by means of CAD, first, the cylindrical part a is drawn as shown in FIG. 36, for example, and the part a is copied and rotated clockwise by 90 degrees to obtain the part b. Then, the parts a and b are joined to the part c to obtain the three-dimensional model shown in FIG. 35. In this case, even if these three parts actually constitute a single part, for example, they are managed by CAD as three separate parts. Consequently, when a parts list is generated, parts that actually do not exist are output.

As another example of drawing a figure by CAD, it is often the case that using a specific surface or the like of a certain part as a reference, another part is made to engage with the part. In such cases, the reference part and the engaged part are often treated as high and, low hierarchical levels, respectively, for convenience' sake. Since, however, which part is engaged by using which part as a reference part can vary depending upon the designer, there often arises a discrepancy between the hierarchical structure at the stage of design and that of actual parts. In such cases, when the data is displayed in the form of parts list, an unnecessary hierarchical structure is disadvantageously generated. One such specific example is shown in FIG. 37. In this example, hexahedrons A and B are engaged with each other and a bar C is inserted into rectangular holes in the central portions of the hexahedrons, as shown in FIG. 38. When constructing such a three-dimensional model, for example, the hexahedron B is engaged with the hexahedron A as the reference part, and then using the hexahedron A as the reference part, the bar C is inserted. FIG. 39(A) shows a hierarchical structure of the parts derived in this case. Specifically, the hexahedron A is at the highest hierarchical level while the hexahedron B and the bar C are classified as subordinate thereto. In the case where the bar C is inserted using the hexahedron B as the reference part, a hierarchical structure shown in FIG. 39(B) is derived. Thus, the hierarchical structure varies depending upon how the parts are combined, and accordingly, when a parts list is generated, an unnecessary hierarchical structure may possibly be shown, making the structure complicated.

Further, drawings etc. created by CAD sometimes require supervisor's approval. Conventionally, however, to enable such a supervisor to view drawings prepared by CAD, the drawings must be printed out or the necessary CAD software must be installed in the supervisor's terminal, but this consumes time and labor.

SUMMARY OF THE INVENTION

The present invention was created in view of the above circumstances, and an object thereof is to provide a three-dimensional model management system which permits three-dimensional model data created by three-dimensional CAD to be utilized more effectively.

To achieve the above object, there is provided a three-dimensional model management system for managing a three-dimensional model in which relationship of subordination of individual parts is represented by a hierarchical structure. The three-dimensional model management system comprises attribute information acquiring means for acquiring attribute information of individual parts constituting the three-dimensional model, sorting means for sorting the attribute information acquired by the attribute information acquiring means in accordance with the hierarchical structure, display form setting means for setting a display form in which the attribute information is to be output for display, editing means for editing the attribute information sorted by the sorting means, in accordance with settings by the display form setting means, and output means for outputting the attribute information edited by the editing means to a display device.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a chart showing an example of display/non-display data;

FIG. 24 is a chart showing an example of newly generated part data;

FIG. 30 is a chart showing an example of newly generated part data;

FIGS. 39(A) and 39(B) are charts showing hierarchical structures of the model shown in FIG. 37, wherein FIG. 39(A) shows a hierarchical structure obtained when a part C is engaged using a part A as a reference part, and FIG. 39(B) shows a hierarchical structure obtained when the part C is engaged using a part B as the reference part.

DESCRIPTION OF THE PREFERRED EMBODIMENTS

An embodiment of the present invention will be hereinafter described with reference to the drawings.

Figure 1:
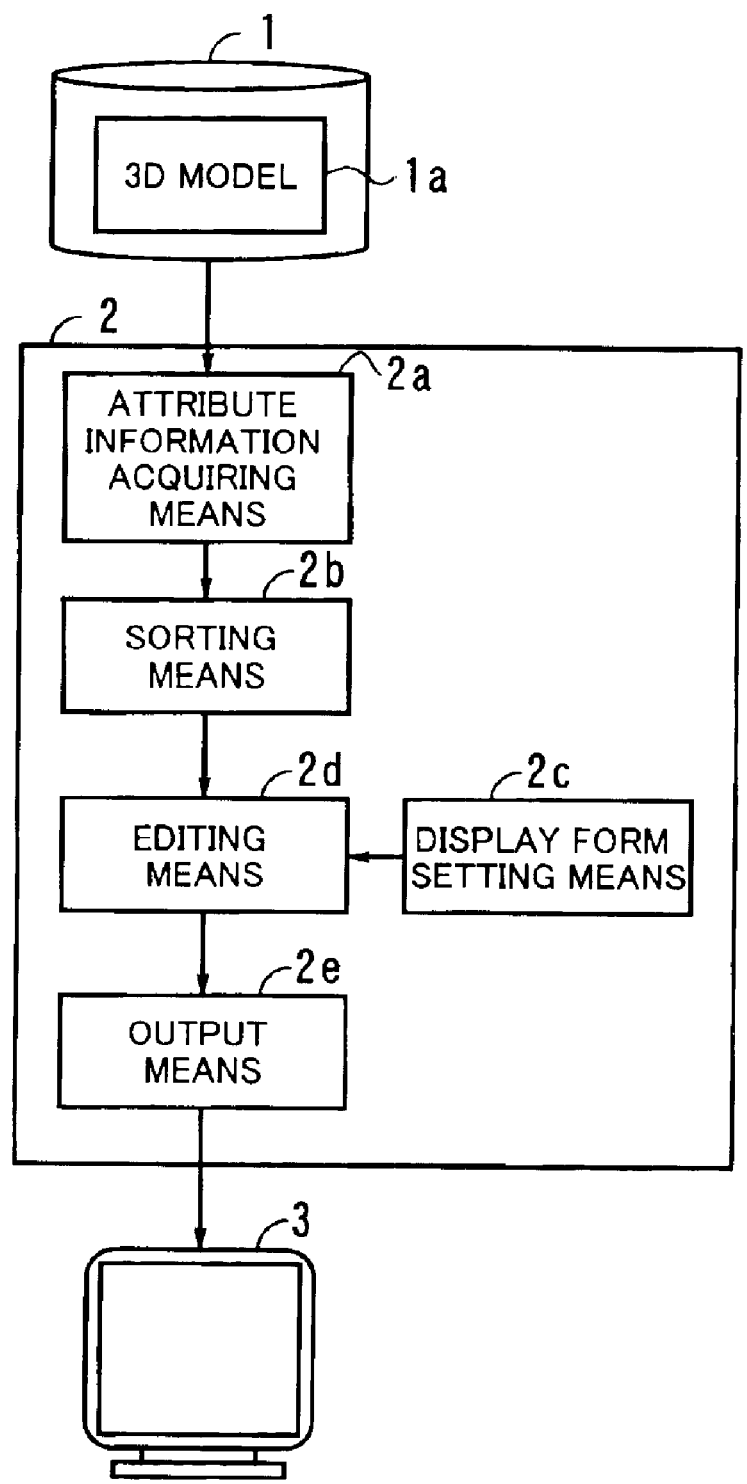
FIG. 1 is a diagram illustrating the principle of operation according to the present invention.

FIG. 1 illustrates the principle of operation according to the present invention. In the figure, a storage device 1 stores a three-dimensional model 1a. A three-dimensional model management system 2 comprises attribute information acquiring means 2a, sorting means 2b, display form setting means 2c, editing means 2d, and output means 2e. The management system acquires attribute information from the three-dimensional model 1a stored in the storage device 1 to generate data for display and supplies the generated data to a display device 3 to be displayed thereby.

The attribute information acquiring means 2a acquires attribute information (e.g., part names) of individual parts constituting the three-dimensional model 1a.

The sorting means 2b sorts the attribute information acquired by the attribute information acquiring means 2a, in accordance with a hierarchical structure that the three-dimensional model has.

The display form setting means 2c sets a display form in which the attribute information sorted according to the hierarchical structure is to be output for display.

The editing means 2d edits the attribute information sorted by the sorting means 2b, in accordance with the settings by the display form setting means 2c.

The output means 2e outputs the attribute information edited by the editing means 2d to the display device 3.

The display device 3 comprises a CRT (Cathode Ray Tube) monitor or the like, for example, and displays an image signal output from the three-dimensional model management system 2.

Operation according to the illustrated principle will be now described.

Figure 2:
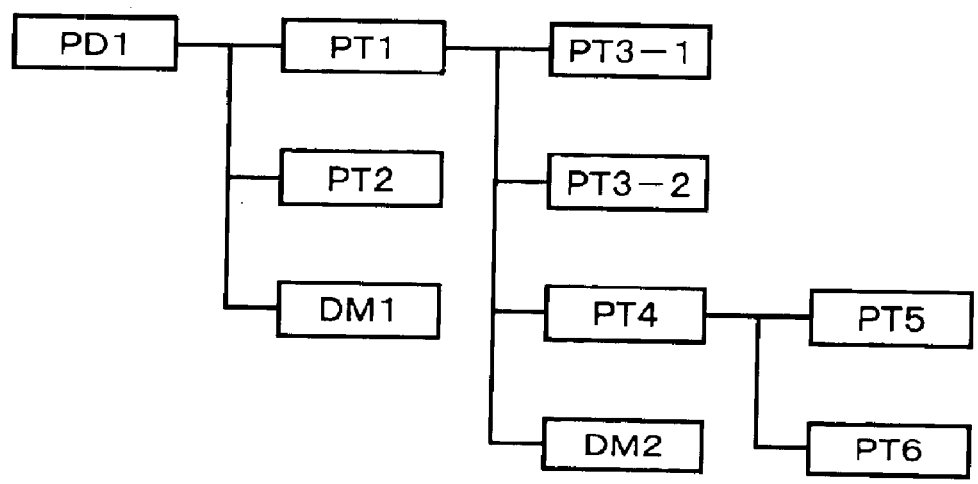
FIG. 2 is a chart showing a hierarchical structure of a three-dimensional model stored in a storage device appearing in FIG. 1.

Let it be assumed that a three-dimensional model having a hierarchical structure shown in FIG. 2 is stored as the three-dimensional model 1a to be processed. In the figure, PT1, PT2, PT3-1, PT3-2, and PT4 to PT6 are part names (attribute information), and DM1 and DM2 represent dummy parts which are used for purposes of the convenience of creating the three-dimensional model and which have no substance. PT3-1 and PT3-2 are registered as separate parts just for convenience' sake and constitute a single part in substance. Also, PT5 and PT6 are illustrated as if they are subordinate to PT4, but this relationship of subordination is just for purposes of the convenience of drawing by CAD and PT4 to PT6 are actually in coordinate relationship.

The attribute information acquiring means 2a acquires the part names as the attribute information from the three-dimensional model 1a stored in the storage device 1, and supplies the acquired part names to the sorting means 2b.

On receiving the part names acquired by the attribute information acquiring means 2a, the sorting means 2b sorts the part names in accordance with data (not shown) indicative of the hierarchical structure which the three-dimensional model 1a has. Specifically, the part names and the data indicative of the hierarchical structure are stored separately; therefore, these items of data are acquired and then the part names are sorted. As a result, the part names are sorted as shown in FIG. 2.

The display form setting means 2c sets a display form in which the part names sorted by the sorting means 2b are to be output for display. It is here assumed, for example, that the following three settings are made: (1) dummy parts are parts which do not actually exist and thus are not displayed; (2) those parts which are separated for purposes of the convenience of design by CAD are unified; and (3) those parts which are in hierarchical relationship just because of the convenience of design by CAD are shown flat.

In accordance with the settings made by the display form setting means 2c, the editing means 2d edits the part names sorted according to the hierarchical structure. Specifically, in accordance with the setting (1), the dummy parts DM1 and DM2 are excluded from the hierarchical structure. Also, in accordance with the setting (2), PT3-1 and PT3-2, which actually constitute a single part, are combined into one part and "PT3" is newly generated as a part name for the combined part. Further, in accordance with the setting (3), PT4 to PT6, which are actually not in hierarchical relationship, are redefined as parts belonging to the same hierarchical level.

The part names edited by the editing means 2d are supplied to the output means 2e, which then converts the part names into image signal and outputs the signal to the display device 3 to be displayed thereby.

Figure 3:
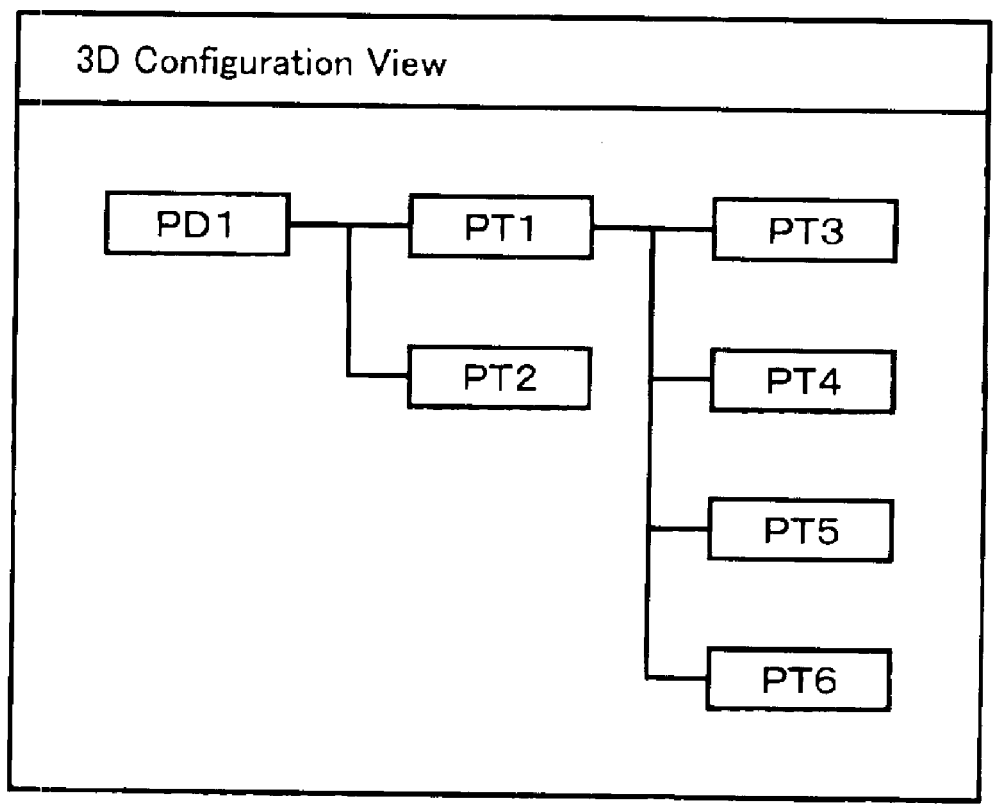
FIG. 3 shows a screen displayed as a result of processing of the three-dimensional model in FIG. 2, stored in the storage device.

FIG. 3 shows an example of a screen displayed at the display device 3 as a result of the aforementioned processing. Compared with FIG. 2, the dummy parts DM1 and DM2 are excluded as illustrated. Also, PT3-1 and PT3-2 are combined and shown as the single part PT3. Further, PT5 and PT6, which are apparently subordinate to PT4, are shown at the same hierarchical level as PT4.

Thus, according to the present invention, the information peculiar to a three-dimensional model created by three-dimensional CAD can be edited and displayed in conformity with actual parts, making it possible to immediately place an order for parts, for example, based on the displayed information.

Figure 4:
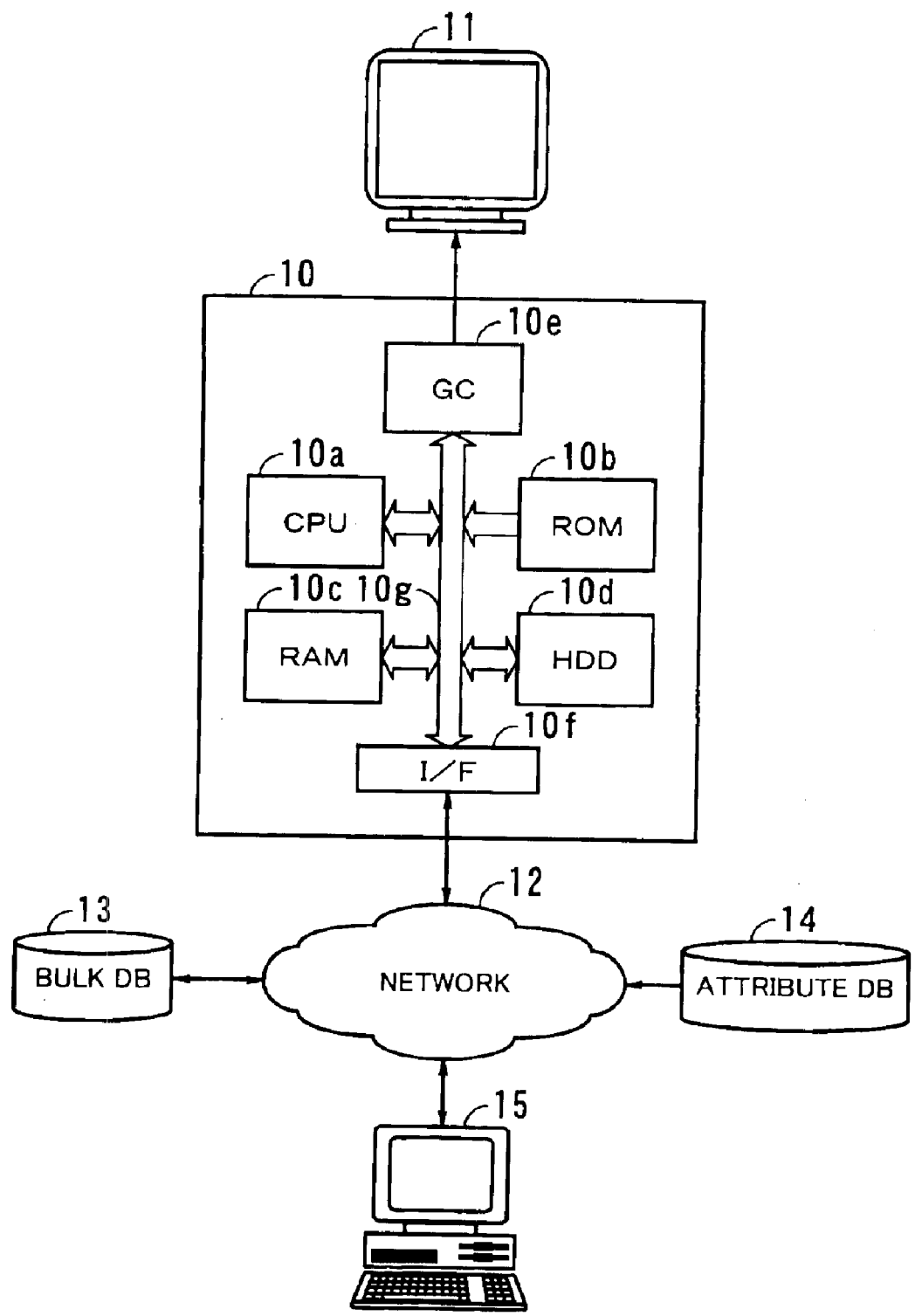
FIG. 4 is a diagram illustrating a configuration according to an embodiment of the present invention.

Referring now to FIG. 4, an embodiment of the present invention will be described.

FIG. 4 is a block diagram illustrating a configuration according to the embodiment of the present invention. As shown in the figure, a three-dimensional model management system 10 is connected via a network 12 to a bulk DB (Data Base) 13, an attribute DB 14, and a terminal unit 15. The management system manages three-dimensional model data and attribute information stored in the bulk DB 13 and the attribute DB 14, respectively, and also supplies part of the data under its management to the terminal unit 15 after appropriately modifying same.

The three-dimensional model management system 10 comprises a CPU (Central Processing Unit) 10a, a ROM (Read Only Memory) 10b, a RAM (Random Access Memory) 10c, an HDD (Hard Disk Drive) 10d, a GC (Graphics Card) 10e, an I/F (Interface) 10f, and a bus 10g.

The CPU 10a performs various arithmetic operations in accordance with programs stored in the HDD 10d etc. and also controls individual parts of the system.

The ROM 10b stores basic programs executed by the CPU 10a, data, etc.

The RAM 10c temporarily stores programs being executed by the CPU 10a, data derived in the middle of operations, etc.

The HDD 10d stores various programs and data.

The GC 10e performs operations in accordance with draw instructions supplied from the CPU 10a and converts an obtained image into a video signal, which is supplied to a display device 11.

The I/F 10f appropriately modifies the representation form of data when the data is exchanged with other devices through the network 12, and also performs control in accordance with a prescribed communication protocol.

The bus 10g interconnects the CPU 10a, ROM 10b, RAM 10c, HDD 10d, GC 10e and I/F 10f, and permits data to be exchanged between these elements.

The display device 11 comprises a CRT monitor or the like and displays the video signal supplied thereto from the GC 10e.

The network 12 is, for example, a LAN (Local Area Network), and allows data to be exchanged among the three-dimensional model management system 10, the bulk DB 13, the attribute DB 14 and the terminal unit 15.

The bulk DB 13 stores bulk data, that is, actual data of three-dimensional models, separately in the form of parts or units (hereinafter referred collectively as parts), for example. When a certain device makes a request for data, the bulk DB acquires the corresponding data and supplies same to the device through the network 12.

The attribute DB 14 stores attribute information of individual parts constituting the three-dimensional models stored in the bulk DB 13, that is, information about part names, authors, creation dates, relationships of subordination with respect to other parts, etc.

The terminal unit 15 comprises a personal computer or the like and is capable of making reference to the information on the three dimensional models which are under the management of the three-dimensional model management system 10.

Operation of the above embodiment will be now described.

Figure 5:
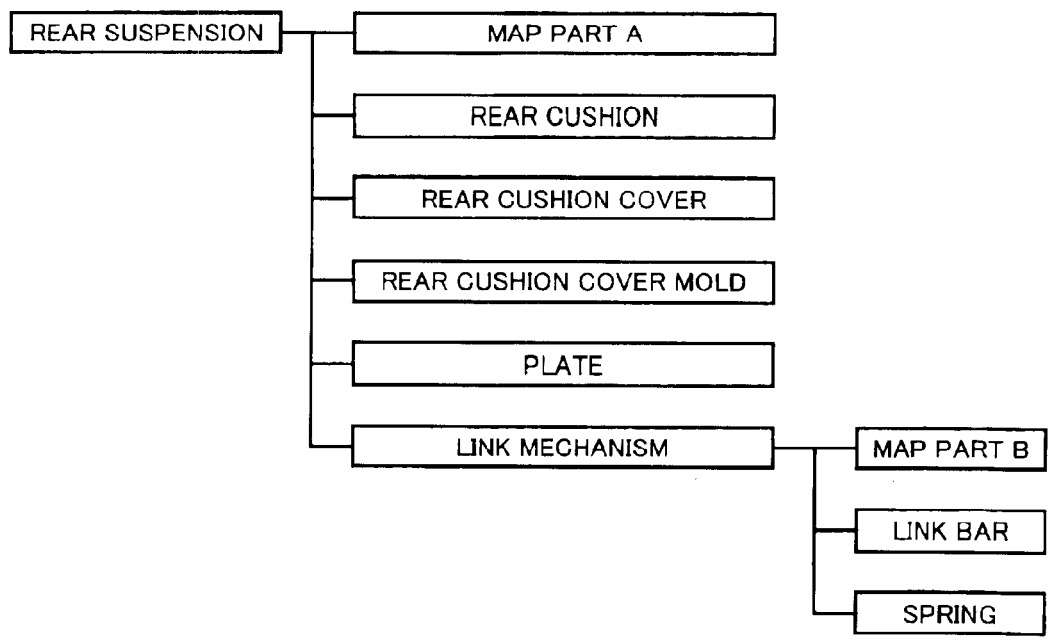
FIG. 5 is a chart showing an example of a three-dimensional model processed by the embodiment shown in FIG. 4.

It is assumed that data of a three-dimensional model having a hierarchical structure shown in FIG. 5 is stored in the bulk DB 13 and the attribute DB 14. Specifically, actual data corresponding to individual parts shown in the figure is stored in the bulk DB 13, and attribute information including part names of the individual parts, authors, creation dates, relationships of subordination with respect to other parts, as well as storage locations, etc. is stored in the attribute DB 14.

Figure 6:
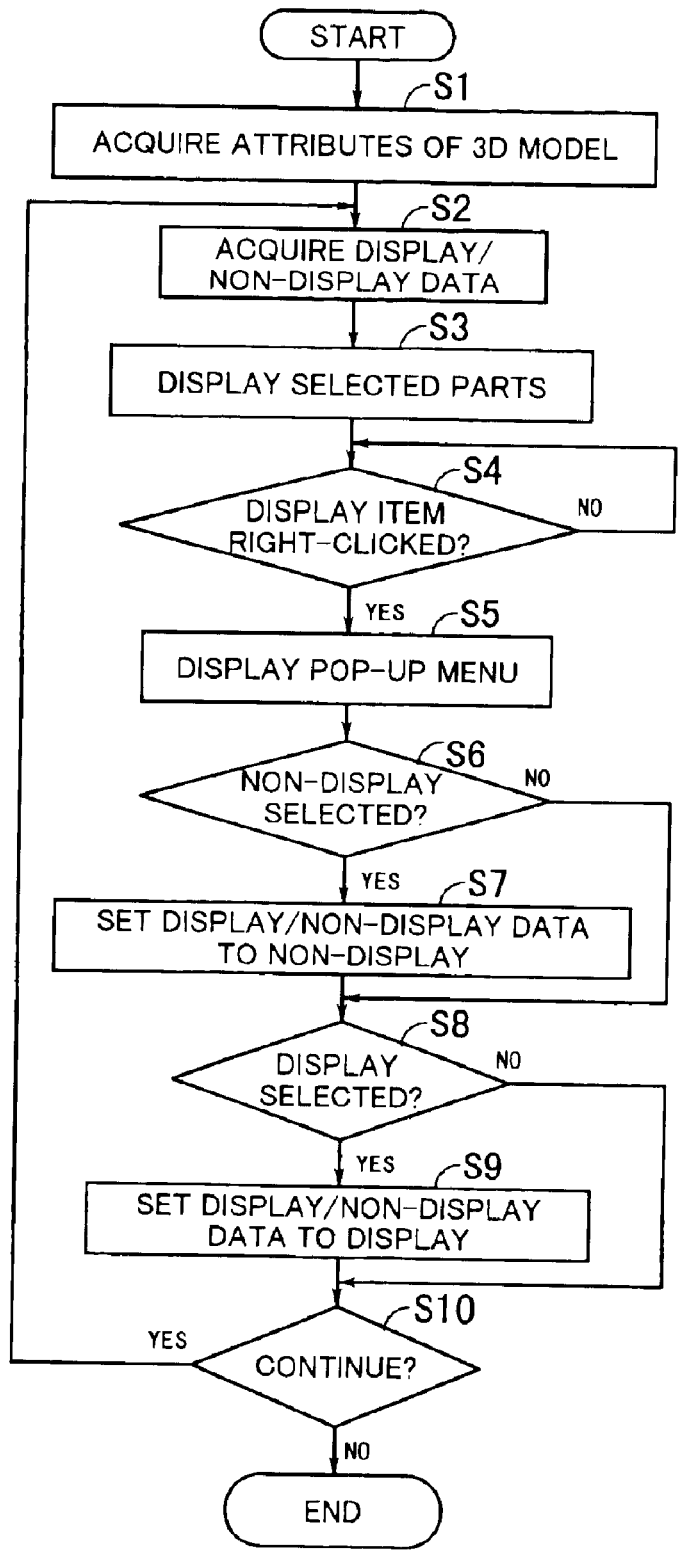
FIG. 6 is a flowchart showing an example of a process for displaying parts constituting a three-dimensional model and a 3D configuration view screen showing a hierarchical structure of the parts.

With the above three-dimensional model stored, an operation may be performed to display a 3D configuration view showing the three-dimensional configuration of the three-dimensional model, whereupon a process shown in the flowchart of FIG. 6 is executed. Upon start of the process shown in the flowchart, the following steps are executed.

[S1] The CPU 10a acquires attributes (part names etc.) of the parts constituting the three-dimensional model from the attribute DB 14.

[S2] The CPU 10a acquires, from the attribute DB 14, display/non-display data indicating whether the individual parts are to be displayed or non-displayed.

FIG. 7 shows an example of the display/non-display data. In the illustrated example, "Display" is selected for all of "Map Part", which is a dummy part, "Mold", and "In-process Part" which denotes a part in process.

Figure 8:
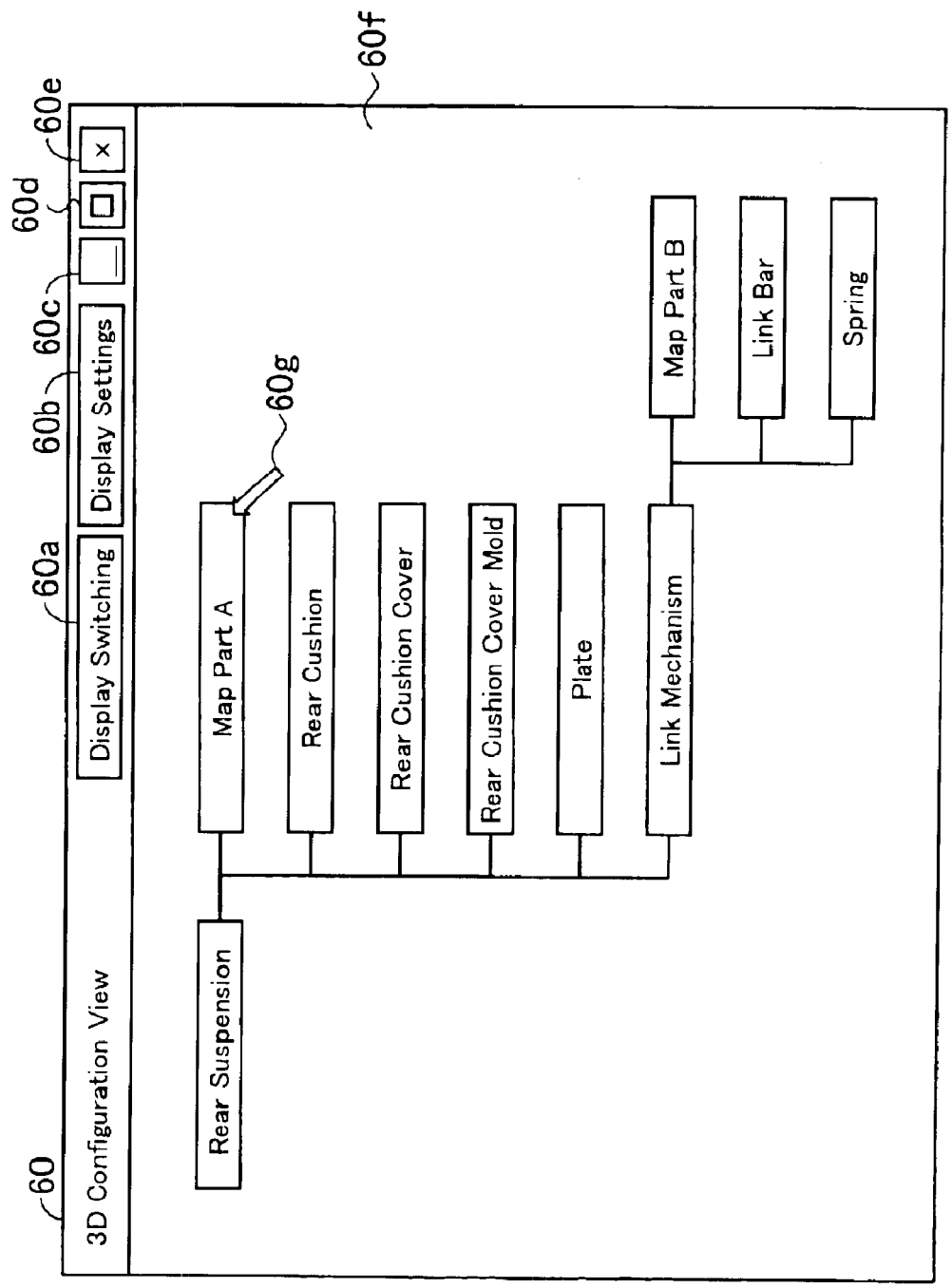
FIG. 8 is a diagram showing an example of the 3D configuration view screen.

[S3] The CPU 10a controls the GC 10e to have a window 60, shown in FIG. 8, displayed at the display device 11, and also looks up the display/non-display data shown in FIG. 7 to display those parts for which "Display" has been selected, in a display area 60f of the window 60.

In the example shown in FIG. 8, the window 60 entitled "3D Configuration View" is displayed. On the right side of the title bar is shown a display switching button 60a which is operated to switch contents of display. A display settings button 60b, which is operated to set display contents, is shown to the right of the display switching button. To the right of the display settings button are shown buttons 60c to 60e which are operated to minimize, maximize and close the window 60, respectively. Further, a chart showing the configuration of the parts corresponding to the one shown in FIG. 5 is displayed in the display area 60f beneath the title bar. Since, in this example, all of the parts are set to be displayed as shown in FIG. 7, the display area 60f shows all parts.

[S4] If, with a certain item in the display area 60f specified with a mouse, not shown, the right mouse button is clicked (hereinafter right-clicked), the CPU 10a executes Step S5: if not, the flow returns and repeats Step S4.

Let it be assumed that "Map Part A" is selected with a cursor 60g, as shown in FIG. 8, and then right-clicked. In this case, the decision in Step S4 becomes YES, and the flow proceeds to Step S5.

[S5] The CPU 10a has a pop-up menu displayed on screen.

Figure 9:
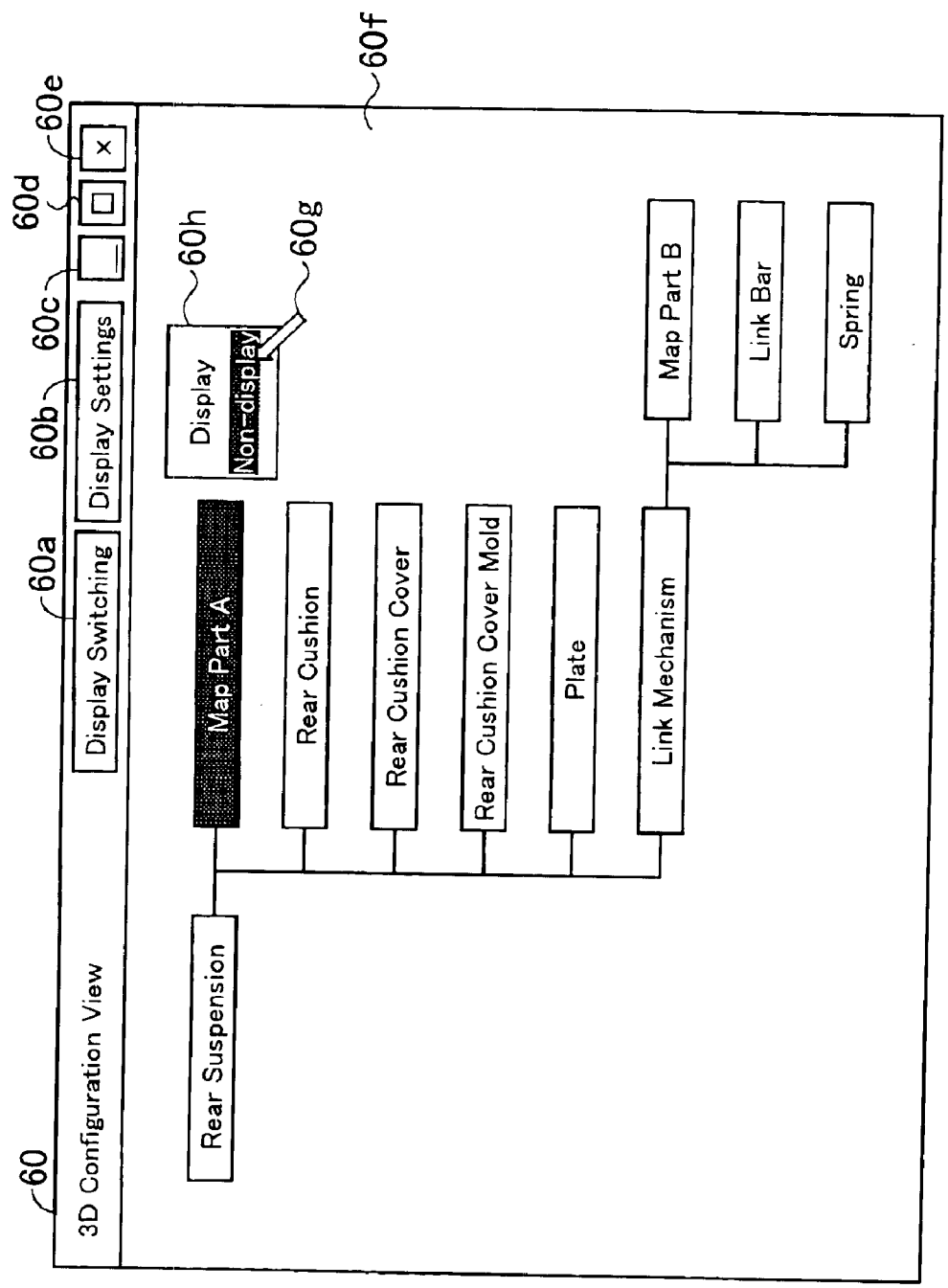
FIG. 9 is a diagram showing how the 3D configuration view screen looks when a map part is right-clicked.

FIG. 9 shows an example of a screen on which a pop-up menu 60h is displayed. In this example, the pop-up menu includes "Display" and "Non-display" as its selection items.

[S6] If "Non-display" is selected in the pop-up menu 60h, the CPU 10a executes Step S7; otherwise the flow proceeds to Step S8.

If "Non-display" is selected as shown in FIG. 9, Step S7 is executed.

[S7] The CPU 10a sets the corresponding item in the display/non-display data to "Non-display".

In the example shown in FIG. 9, "Map Part A" has been selected; therefore, the CPU 10a judges from the attribute information associated with the selected part that this part has the attribute "Map Part", and thus sets the map part in the display/non-display data shown in FIG. 7 to be non-displayed.

[S8] If "Display" is selected in the pop-up menu 60h, the CPU 10a executes Step S9; otherwise the flow proceeds to Step S10.

[S9] The CPU 10a sets the corresponding item in the display/non-display data to "Display".

[S10] The CPU 10a determines whether to continue the process or not. If the process is to be continued, the flow returns to Step S2 and the same process as described above is repeated; if not, the process is ended.

Figure 10:
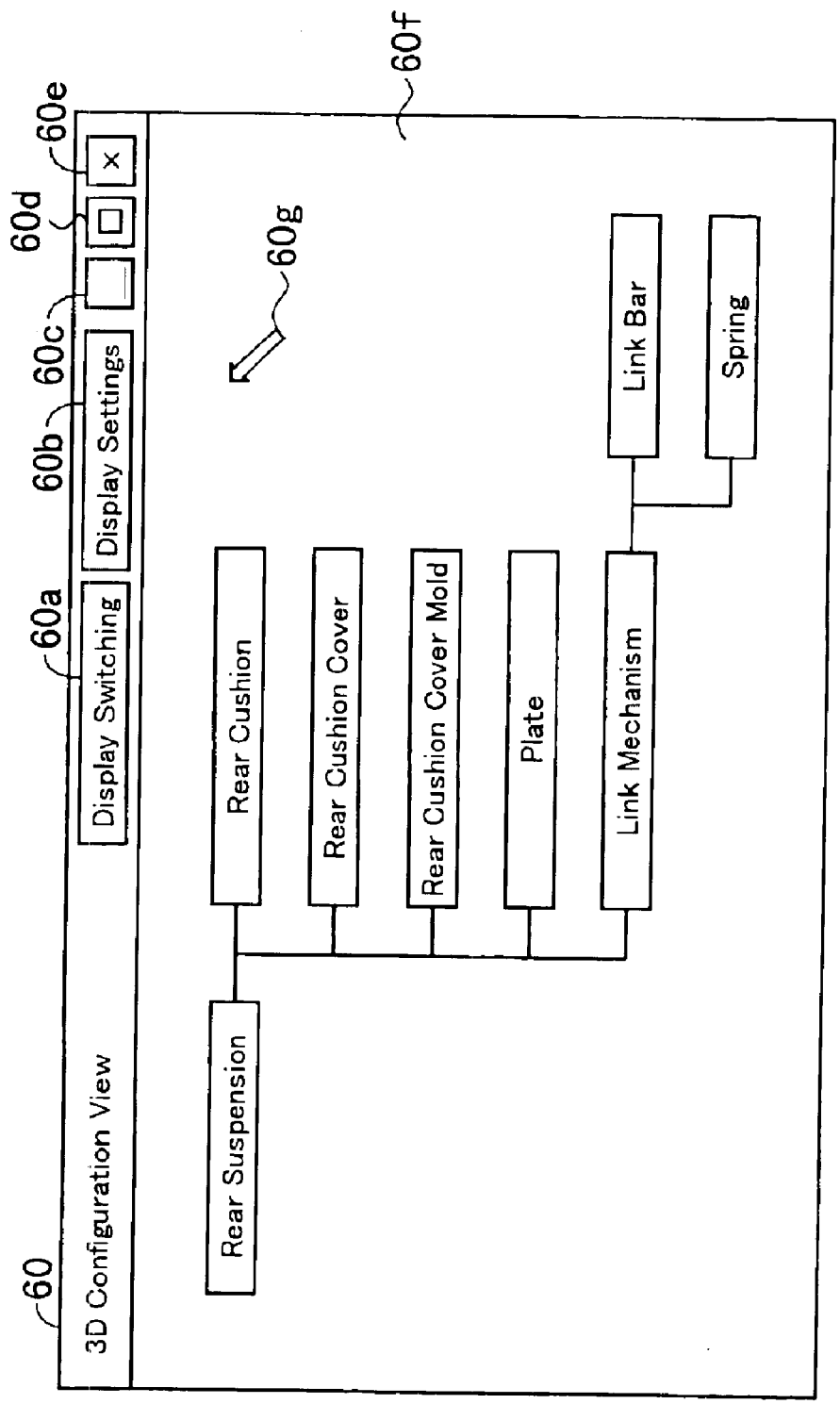
FIG. 10 is a diagram showing an example of how the 3D configuration view screen looks after the item "Non-display" is selected in a pop-up menu appearing in FIG. 9.

If, in this example, the process is determined to be continued, the flow returns to Step S2, and since the map part in the display/non-display data has been set to be non-displayed, the display contents in the display area 60*f* are updated in Step S3, so that a screen as shown in FIG. 10 is displayed. Specifically, as shown in the figure, "Map Part A" and "Map Part B", which are map parts, disappear from the screen.

Figure 11:
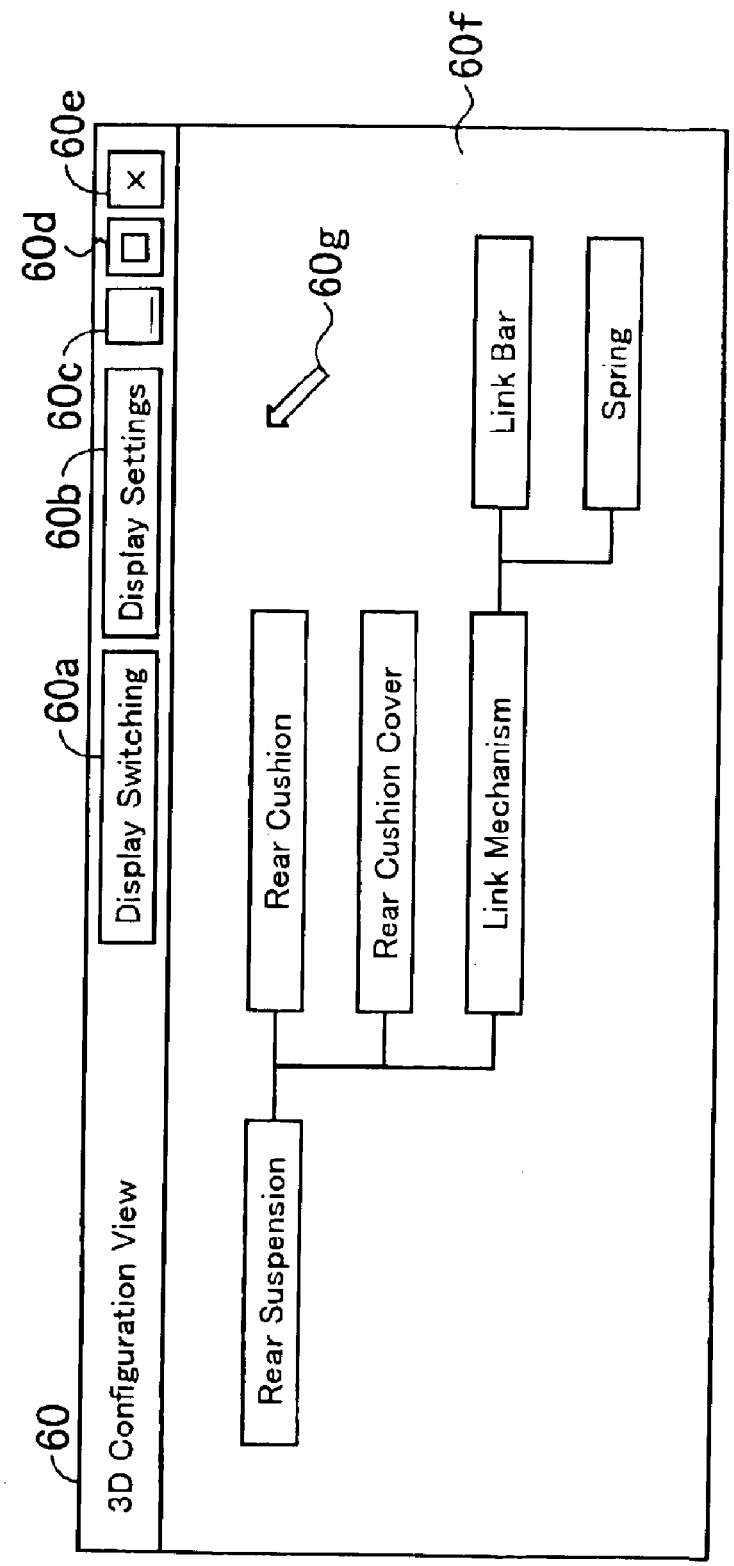
FIG. 11 is a diagram showing an example of how the 3D configuration view screen looks after rear cushion cover mold and plate are set to be non-displayed in the screen shown in FIG. 10.

If "Rear Cushion Cover Mold", which is a mold, and "Plate", which is an in-process part, are thereafter selected and set to be non-displayed by a similar operation, "Mold" and "In-process Part" in the display/non-display data shown in FIG. 7 are set to "Non-display", so that a screen as shown in FIG. 11 is displayed.

According to the process described above, data peculiar to three-dimensional CAD and data of in-process parts can be excluded as needed from the screen. Accordingly, when reference is made to the three-dimensional model at a stage subsequent to design, for example, only the parts necessary for work can be selectively displayed.

Figure 12:
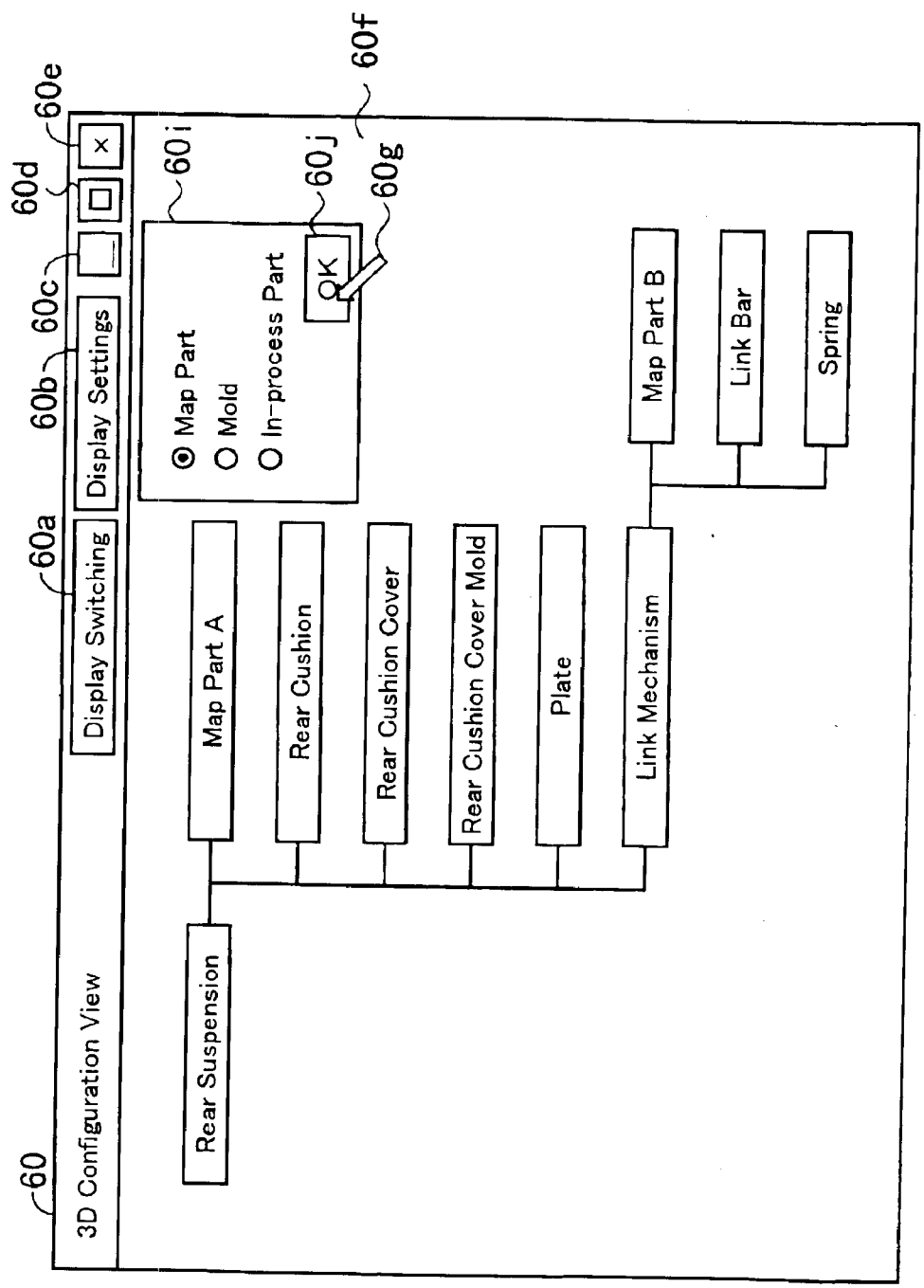
FIG. 12 is a diagram showing how the 3D configuration view screen looks when a display settings button is operated in the screen shown in FIG. 8.
Figure 13:
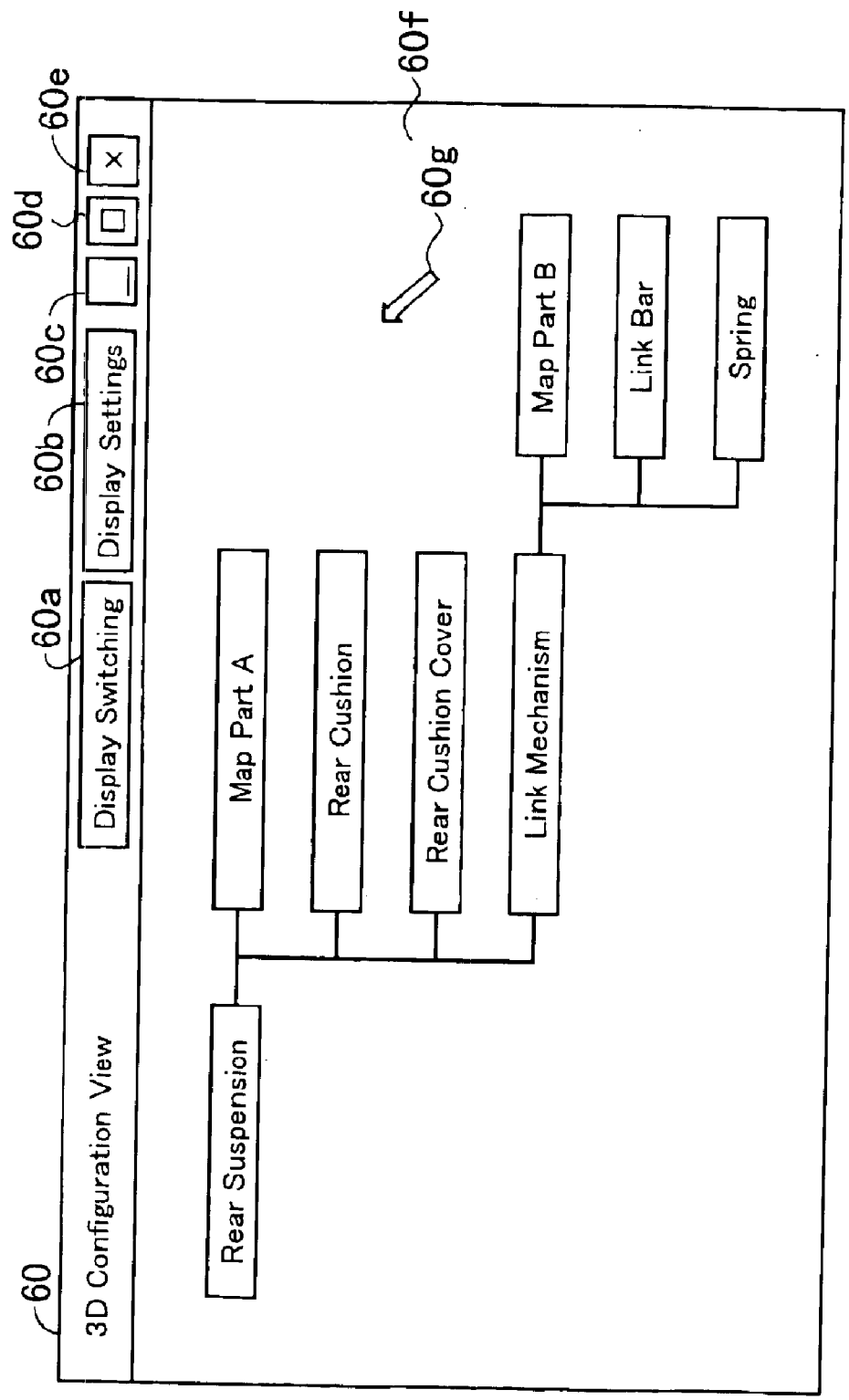
FIG. 13 is a diagram showing an example of how the 3D configuration view screen looks after map parts alone are set to be displayed in the screen shown in FIG. 12.

In the example described above, an item displayed in the display area 60*f* is directly selected and parts associated therewith are set to be displayed or non-displayed. Alternatively, as shown in FIG. 12, for example, a dialog box 60*i* may be displayed when the display settings button 60*b* is operated, so that the individual parts can be checked for display or non-display. In the illustrated example, only the map part is checked ("Display" is selected); therefore, if an OK button 60*j* is operated with the map part selected, the map parts are displayed, so that a screen as shown in FIG. 13 is displayed. Namely, the map parts A and B are displayed again.

In the above embodiment, parts having a specified attribute are collectively set to be displayed or non-displayed, but each part may alternatively be set to be displayed or non-displayed. In this case, more detailed settings can be made, though the setting operation may require time.

Figure 14:
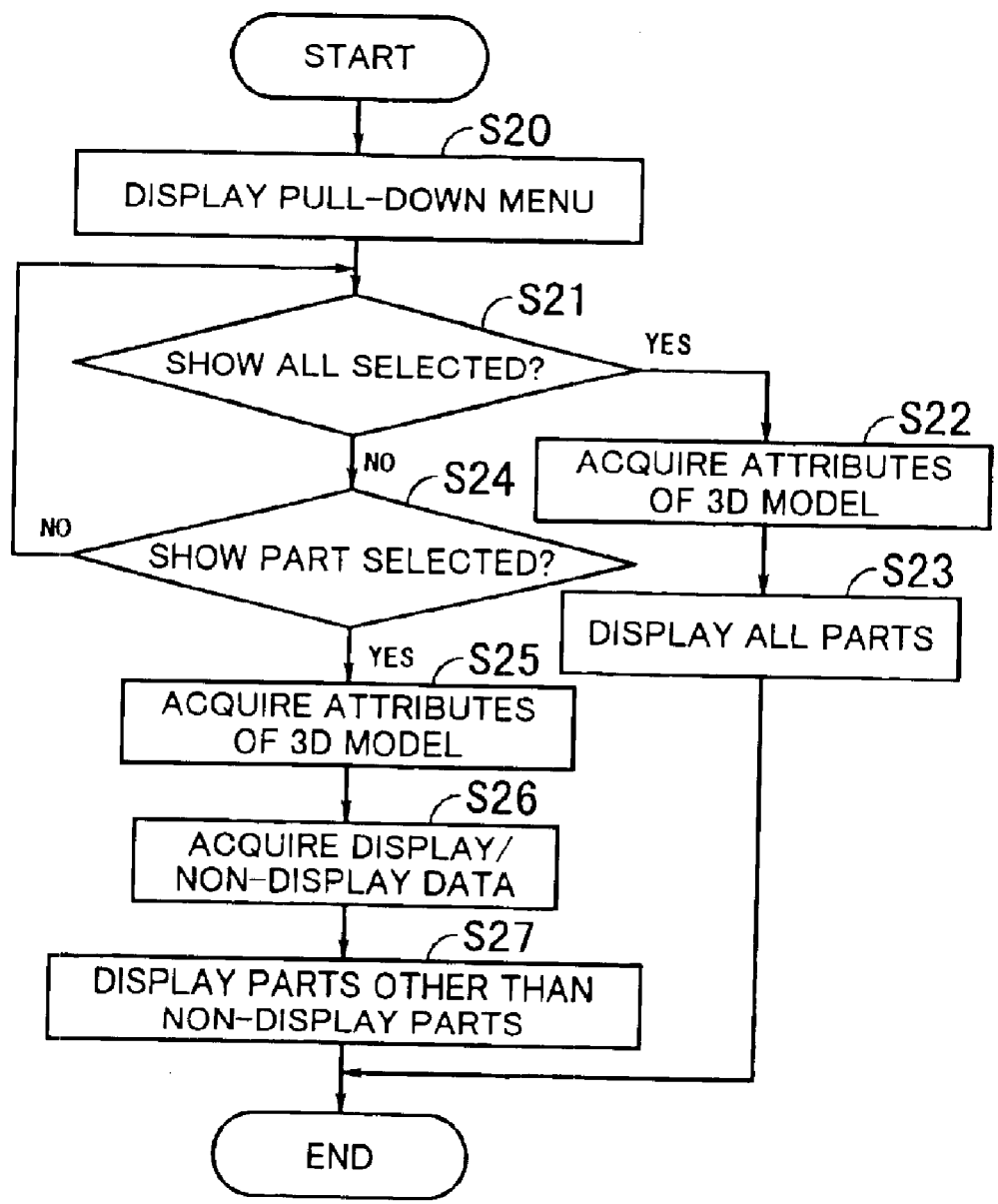
FIG. 14 is a flowchart showing an example of a process executed when a display switching button is operated in the 3D configuration view screen.
Figure 15:
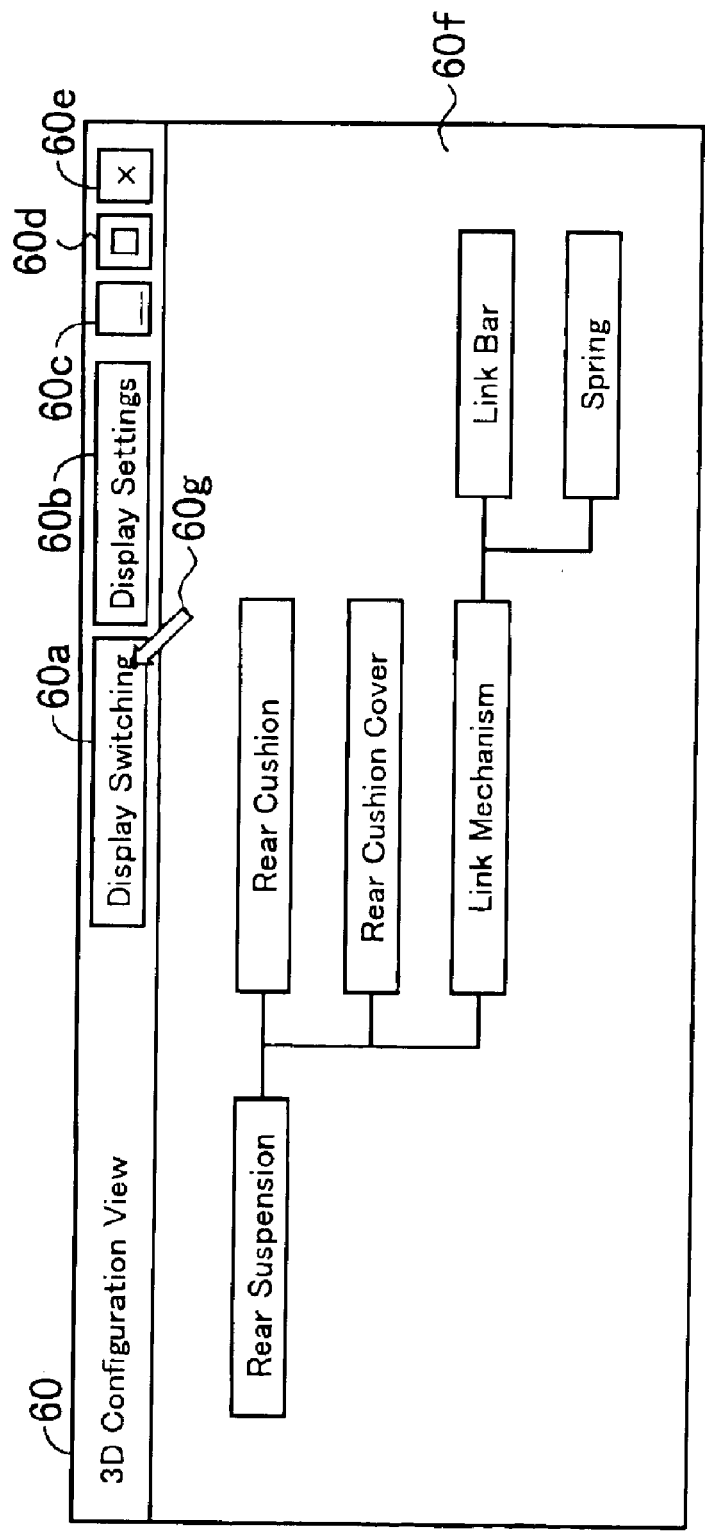
FIG. 15 is a diagram showing an example of the 3D configuration view screen displayed before the display switching button is operated.

A process executed when the display switching button 60*a* is operated, as shown in FIG. 15, will be now described with reference to FIG. 14. Upon start of the process shown in the flowchart of FIG. 14, the following steps are executed.

Figure 16:
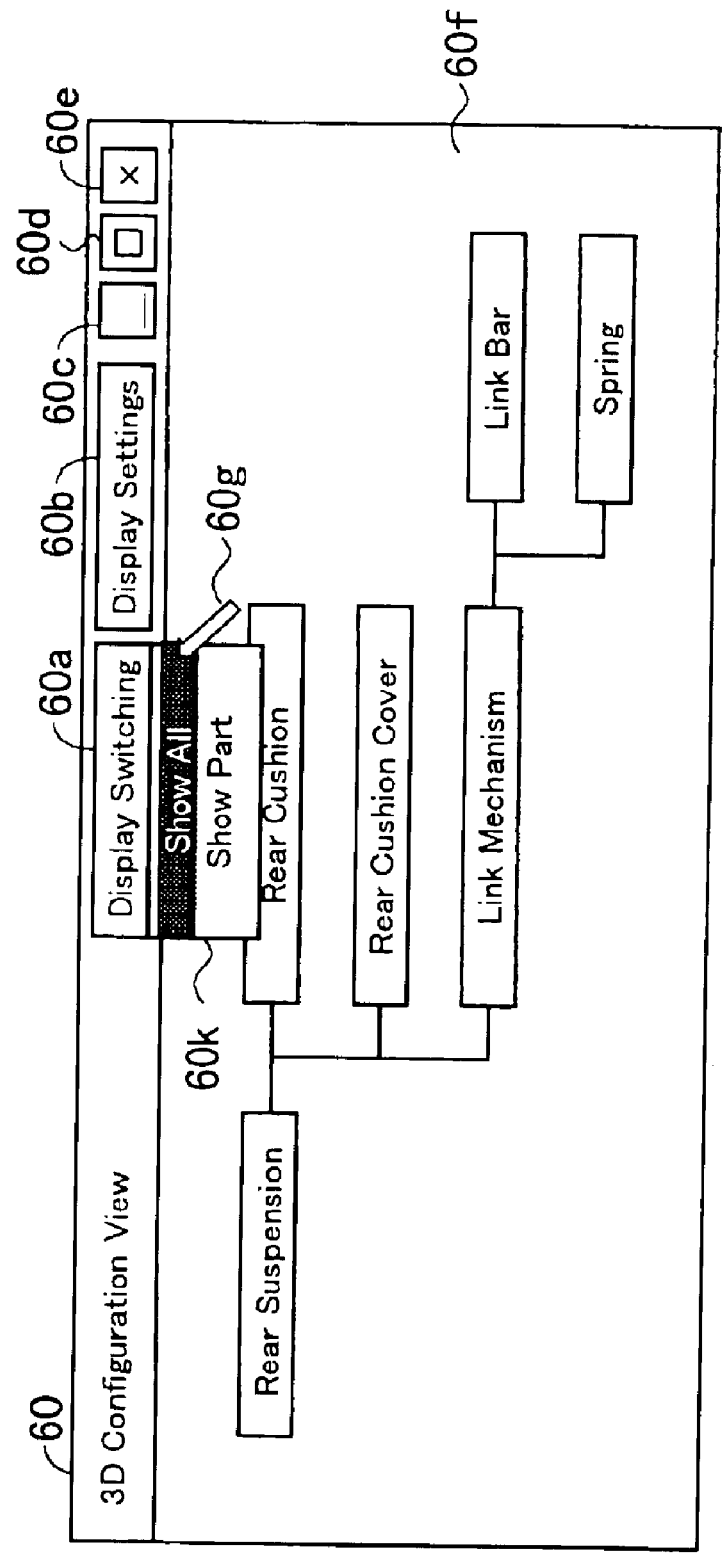
FIG. 16 is a diagram showing an example of the 3D configuration view screen displayed after the display switching button is operated.

[S20] The CPU 10*a* has a pull-down menu displayed on screen, as shown in FIG. 16.

In the illustrated example, a pull-down menu 60*k* displayed includes "Show All" and "Show Part" as its selection items.

[S21] If "Show All" is selected, the CPU 10*a* executes Step S22; otherwise the flow proceeds to Step S24.

Since, in the example shown in FIG. 16, "Show All" is selected, the flow proceeds to Step S22.

[S22] The CPU 10*a* acquires the attributes of the three-dimensional model data from the attribute DB 14.

[S23] The CPU 10*a* displays on screen the data of all parts acquired in Step S22.

Figure 17:
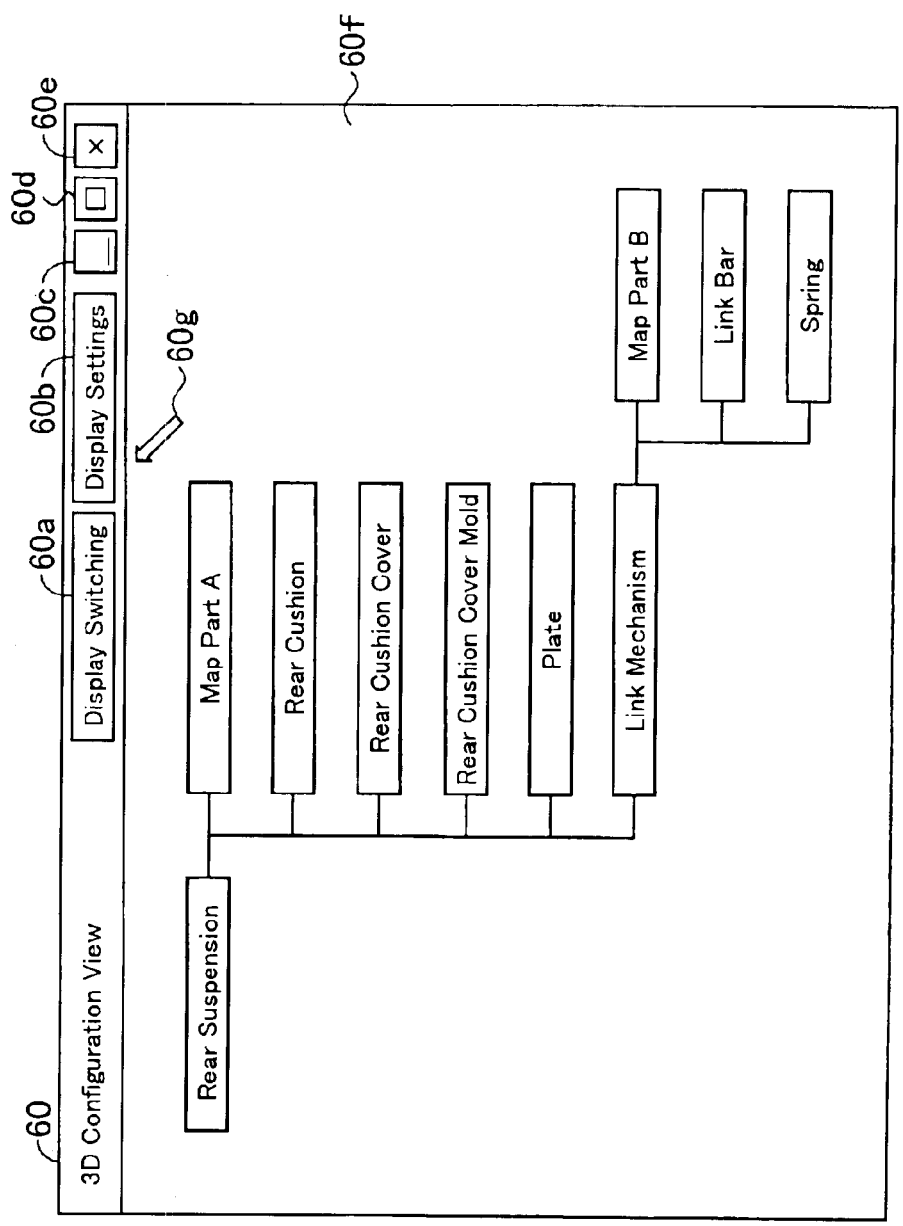
FIG. 17 is a diagram showing an example of how the 3D configuration view screen looks after the item "Show All" is selected in a pop-up menu appearing in FIG. 16.

In this example, "Show All" has been selected, and accordingly, all parts are displayed in the display area 60*f*, as shown in FIG. 17.

[S24] If "Show Part" is selected, the CPU 10*a* executes Step S25; otherwise the flow returns to Step S21 and repeats the aforementioned process.

[S25] The CPU 10*a* acquires the attributes of the three-dimensional model data from the attribute DB 14.

[S26] The CPU 10*a* acquires the display/non-display data from the attribute DB 14.

[S27] The CPU 10*a* displays, in the display area 60*f*, parts other than those for which "Non-display" has been set.

If, while all parts are displayed with "Show All" selected, "Show Part" is selected, for example, parts are displayed again in accordance with the then settings of display/non-display data.

Flat link and multi-link will be now explained.

In the case of design by means of three-dimensional CAD, usually a product to be designed is divided into a plurality of sections and design is performed section by section. Parts designed in this manner are in many cases managed by PDM or the like so that reference can be made to the parts also from other divisions of the company.

Meanwhile, a three-dimensional model created by three-dimensional CAD often has a hierarchical structure generated just for the sake of convenience of drawing, and accordingly, it is generally not desirable that parts having such hierarchical structure be directly managed by PDM or the like. The following describes a method of appropriately converting the hierarchical structure when the three-dimensional model created by three-dimensional CAD is registered in PDM.

Figure 18:
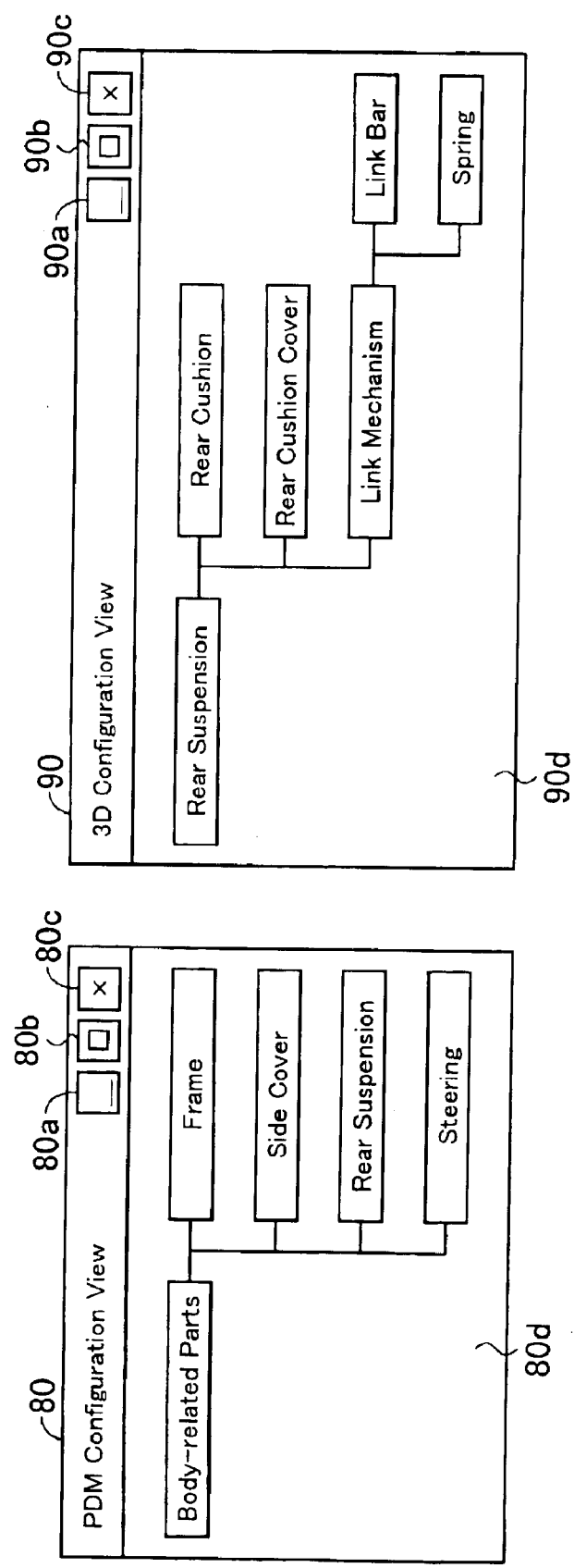
FIG. 18 is a diagram showing an example of display wherein the 3D configuration view screen and a PDM configuration view screen are arranged side by side.

Let it be assumed that, as shown in FIG. 18, a window 80 of a PDM configuration view showing a data structure managed by PDM and a window 90 of the 3D configuration view showing the data structure of the three-dimensional model are displayed on screen. With the windows displayed in this manner, a part appearing in the window 90 is correlated with the PDM configuration view shown in the window 80, and this process will be described with reference to FIG. 19.

Figure 19:
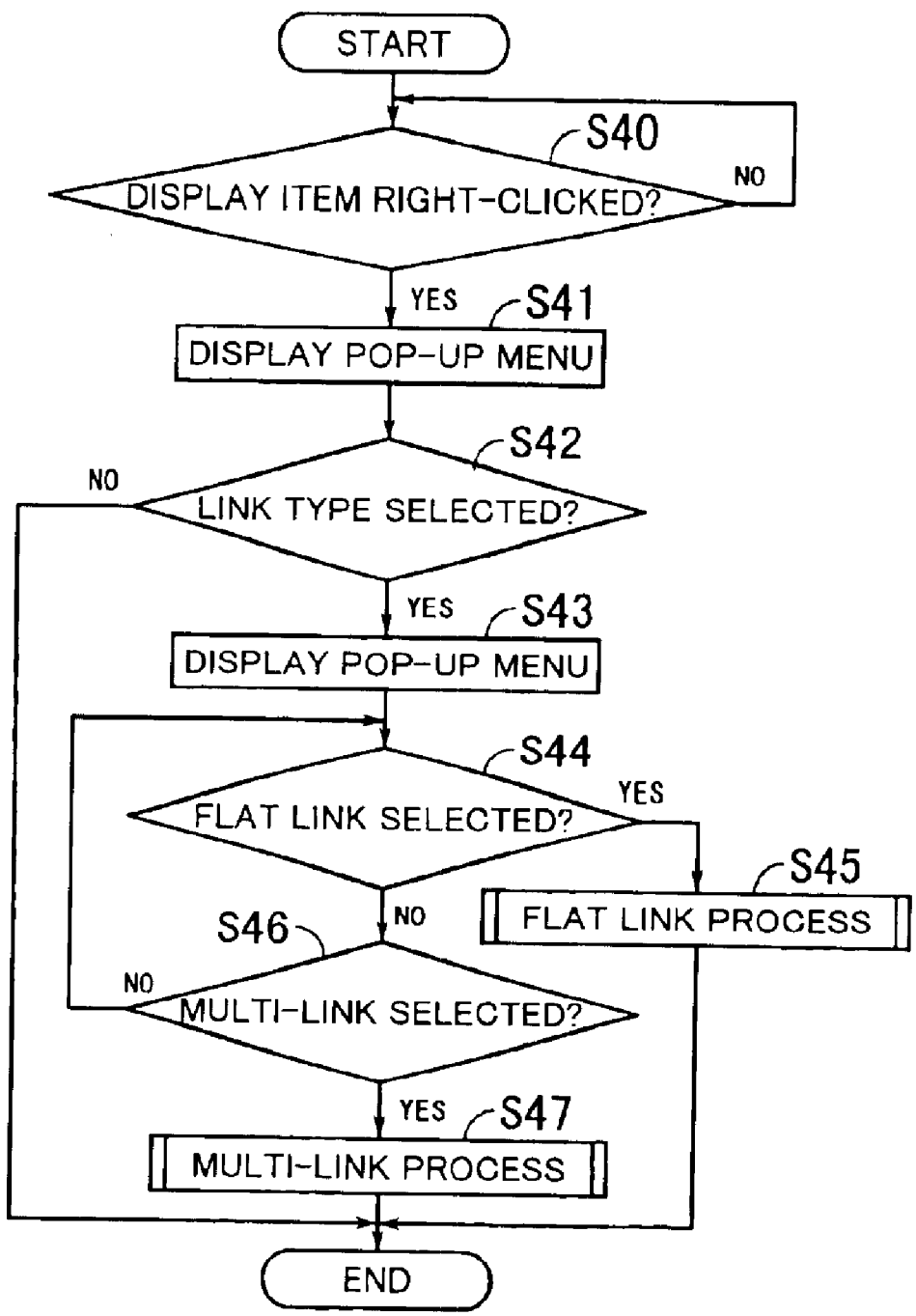
FIG. 19 is a flowchart showing an example of a process for correlating a part shown in the 3D configuration view screen with the PDM configuration view screen.

Upon start of the process shown in the flowchart of FIG. 19, the following steps are executed.

[S40] If, in the PDM configuration view screen (window 80), a certain display item is selected with the mouse, not shown, and right-clicked, the CPU 10*a* executes Step S41; otherwise the flow returns and repeats Step S40.

If "Rear Suspension" in the window 80, for example, is selected and right-clicked, the flow proceeds to Step S41.

[S41] The CPU 10*a* has a pop-up menu displayed on screen.

Figure 21:
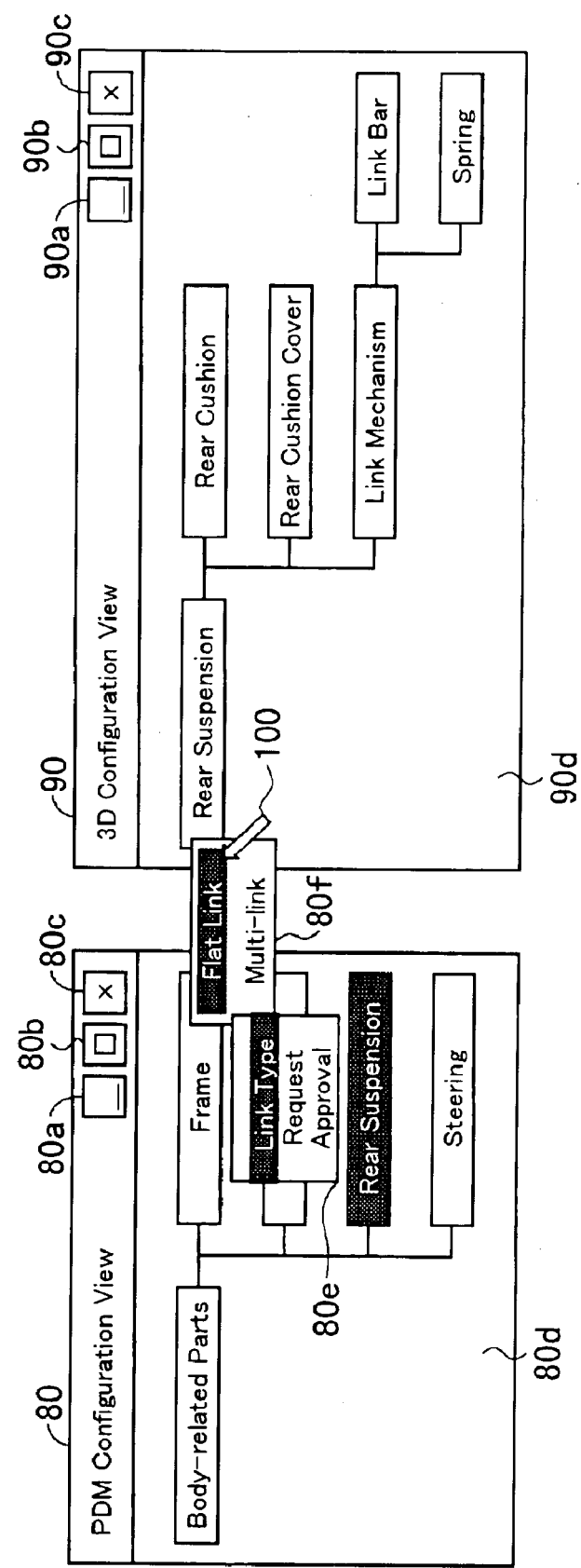
FIG. 21 is a diagram showing an example of display wherein, in the PDM configuration view screen, rear suspension is right-clicked and link type is selected in a pop-up menu during execution of the process shown in FIG. 19.

In this example, "Rear Suspension" has been selected, and a pop-up menu 80*e* including "Link Type" and "Request Approval" as its selection items is displayed near "Rear Suspension", as shown in FIG. 21.

[S42] If "Link Type" is selected in the pop-up menu 80*e*, the CPU 10*a* executes Step S43; otherwise the process is ended.

In the example shown in FIG. 21, "Link Type" is selected, and therefore, the flow proceeds to Step S43.

[S43] The CPU 10*a* has an additional pop-up menu displayed on screen.

In the example of FIG. 21, a pop-up menu 80*f* including "Flat Link" and "Multi-link" as its selection items is displayed near the pop-up menu 80*e*.

[S44] If "Flat Link" is selected in the pop-up menu 80*f*, the CPU 10*a* executes Step S45; otherwise the flow proceeds to Step S46.

In the example shown in FIG. 21, "Flat Link" is selected; therefore, the flow proceeds to Step S45.

[S45] The CPU 10a performs a flat link process in which a part having a hierarchical relationship specific to three-dimensional CAD is correlated flat with the PDM configuration view.

This process will be described in detail later with reference to FIG. 20.

[S46] If "Multi-link" is selected in the pop-up menu 80f, the CPU 10a executes Step S47; if not, the flow returns to Step S44 and repeats the aforementioned process.

[S47] The CPU 10a performs a multi-link process in which parts having a configuration specific to three-dimensional CAD are correlated in an integrated manner with the PDM configuration view.

Details of this process will be described later with reference to FIG. 25.

Figure 20:
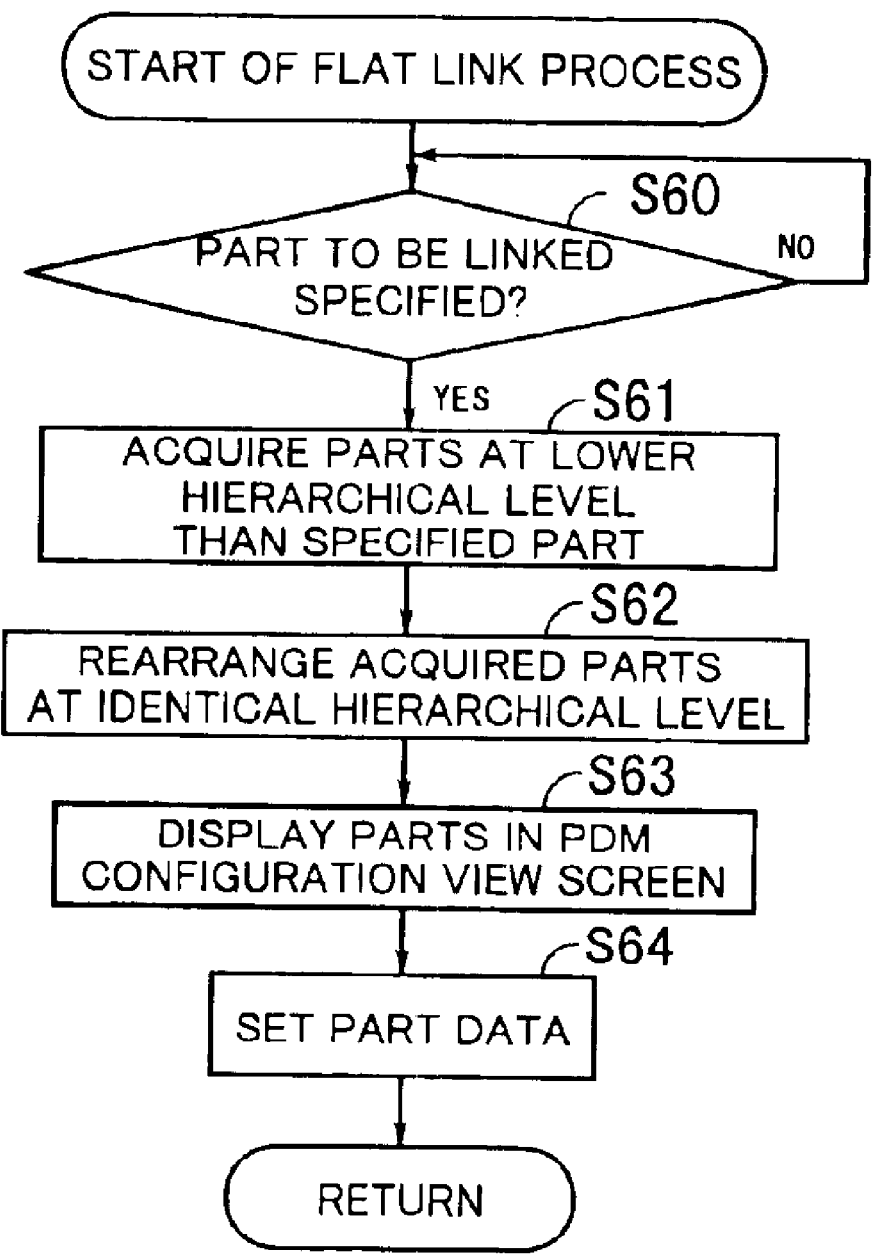
FIG. 20 is a flowchart showing details of a "flat link process" appearing in FIG. 19.
Figure 37:
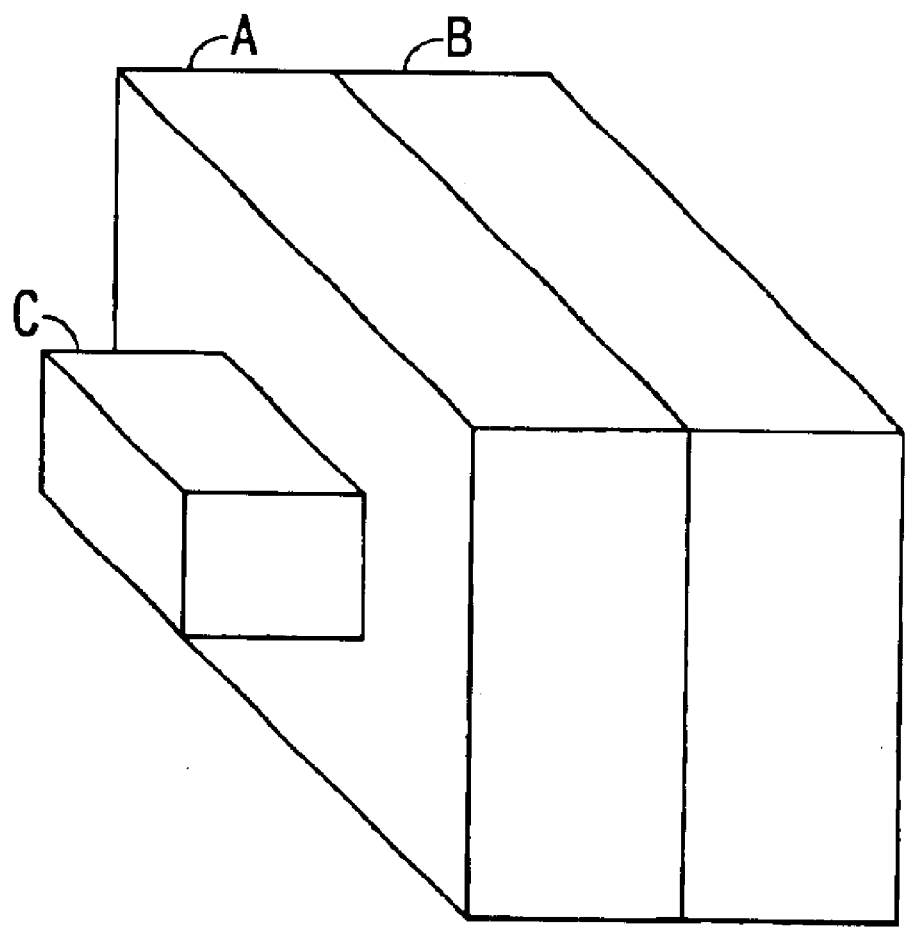
FIG. 37 is a diagram also illustrating a hierarchical structure specific to three-dimensional CAD.
Figure 38:
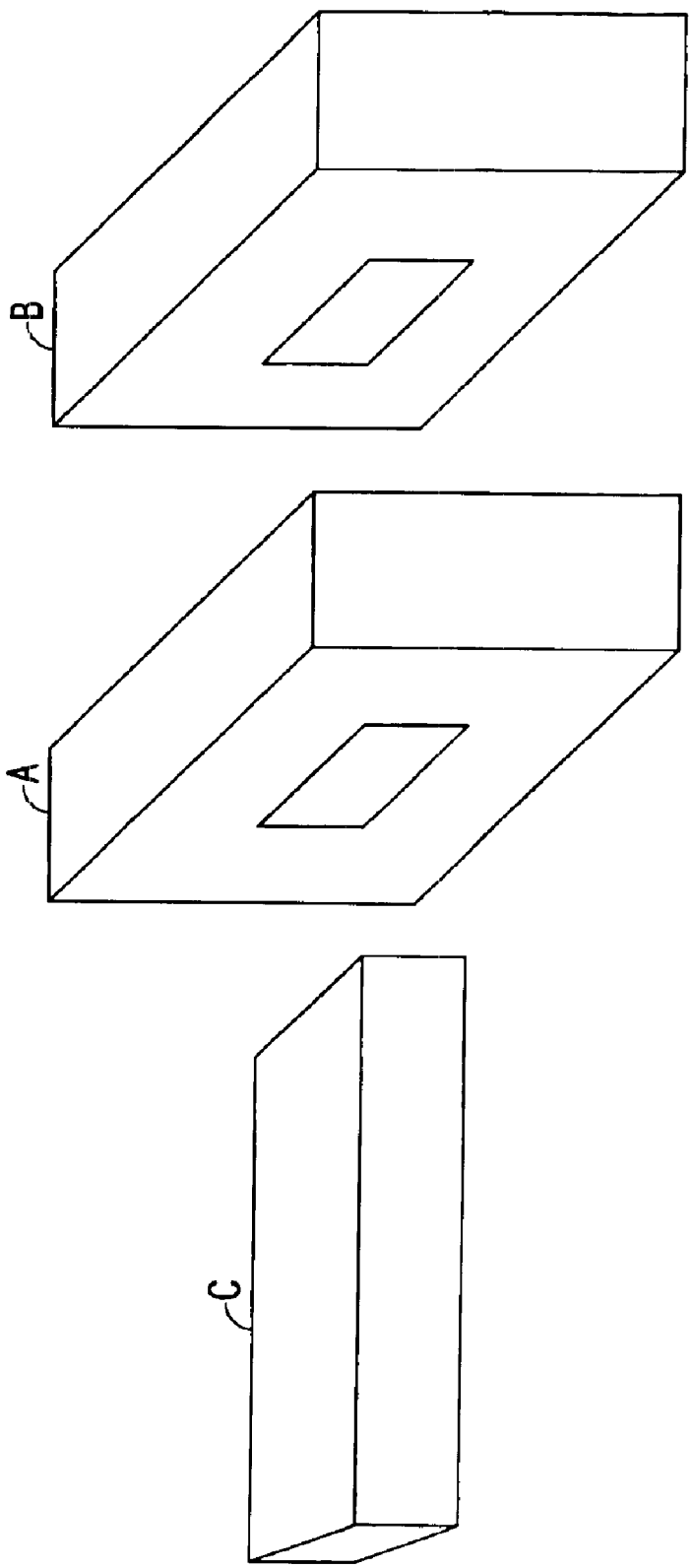
FIG. 38 is a diagram showing a state in which a model shown in FIG. 37 is taken apart.
Figure 39A:
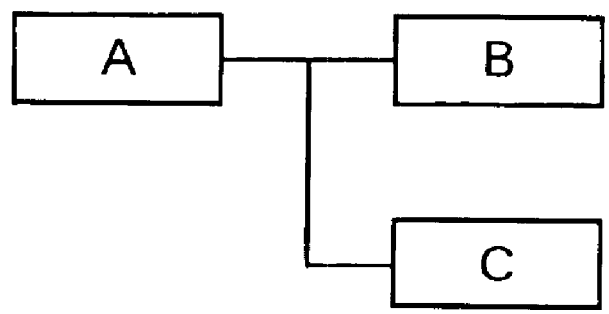
Figure 39B:
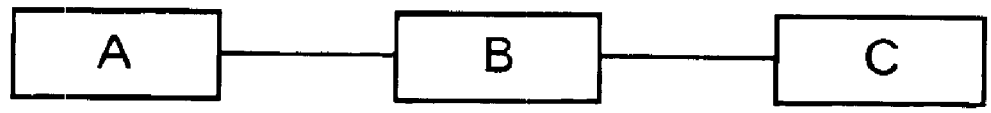

Referring now to FIG. 20, the "flat link process" appearing in FIG. 19 will be described in detail. In the process shown in the flowchart, a hierarchical structure which is generated just for the sake of convenience of operation on three-dimensional CAD, such as those shown in FIGS. 37 to 39, is altered to be flat and correlated with the PDM configuration view. Upon start of the process shown in the flowchart, the following steps are executed.

[S60] The CPU 10a determines whether or not a part to be linked has been specified in the 3D configuration view screen. If such a part has been specified, the flow proceeds to Step S61: if not, the flow returns and repeats Step S60.

Figure 22:
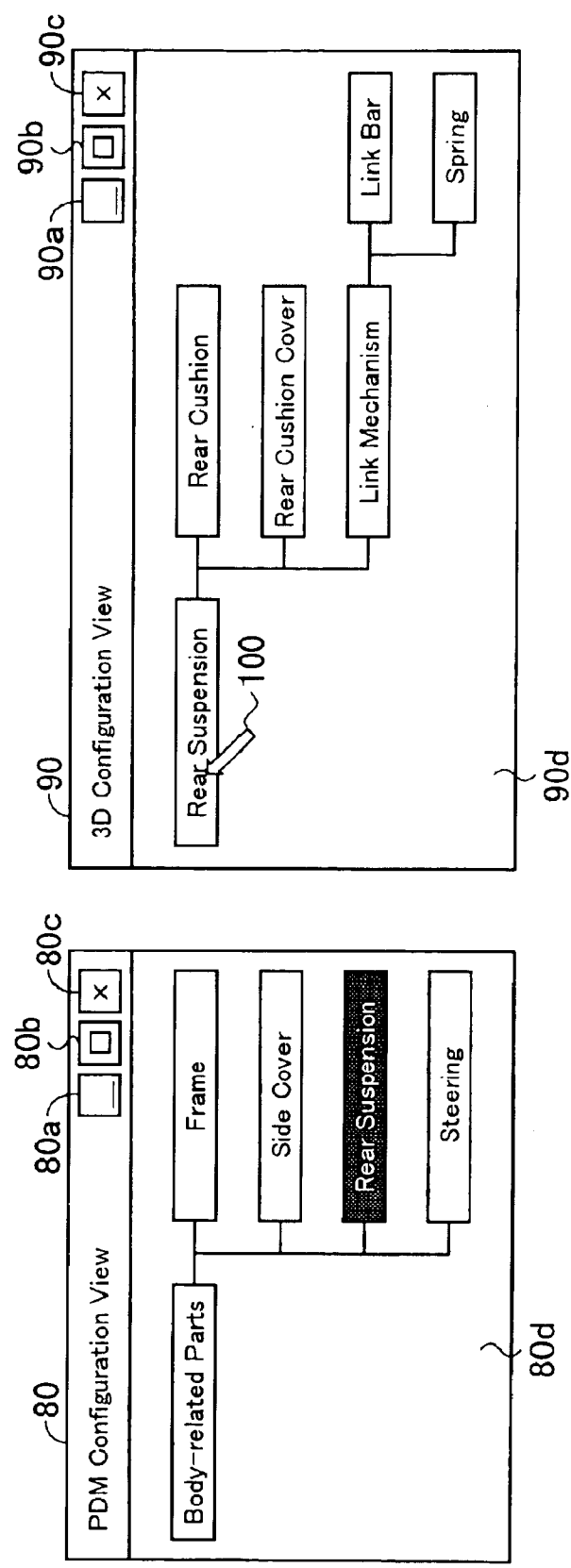
FIG. 22 is a diagram showing how a part to be linked is selected from the 3D configuration view screen during execution of the process shown in FIG. 19.

If, for example, "Rear Suspension" is selected with a cursor 100 in the 3D configuration view screen as the part to be linked, as shown in FIG. 22, the flow proceeds to Step S61.

[S61] The CPU 10a acquires the parts which are at a lower hierarchical level than the specified part.

In the example shown in FIG. 22, "Rear Cushion", "Rear Cushion Cover", "Link Mechanism", "Link Bar" and "Spring", which are at a lower hierarchical level than "Rear Suspension", are acquired.

[S62] The CPU 10a rearranges the acquired parts such that the parts are at an identical hierarchical level.

In the example of FIG. 22, "Link Bar" and "Spring" are rearranged so as to be at the same hierarchical level as "Link Mechanism".

[S63] The CPU 10a has the group of the rearranged parts displayed in the PDM configuration view screen.

Figure 23:
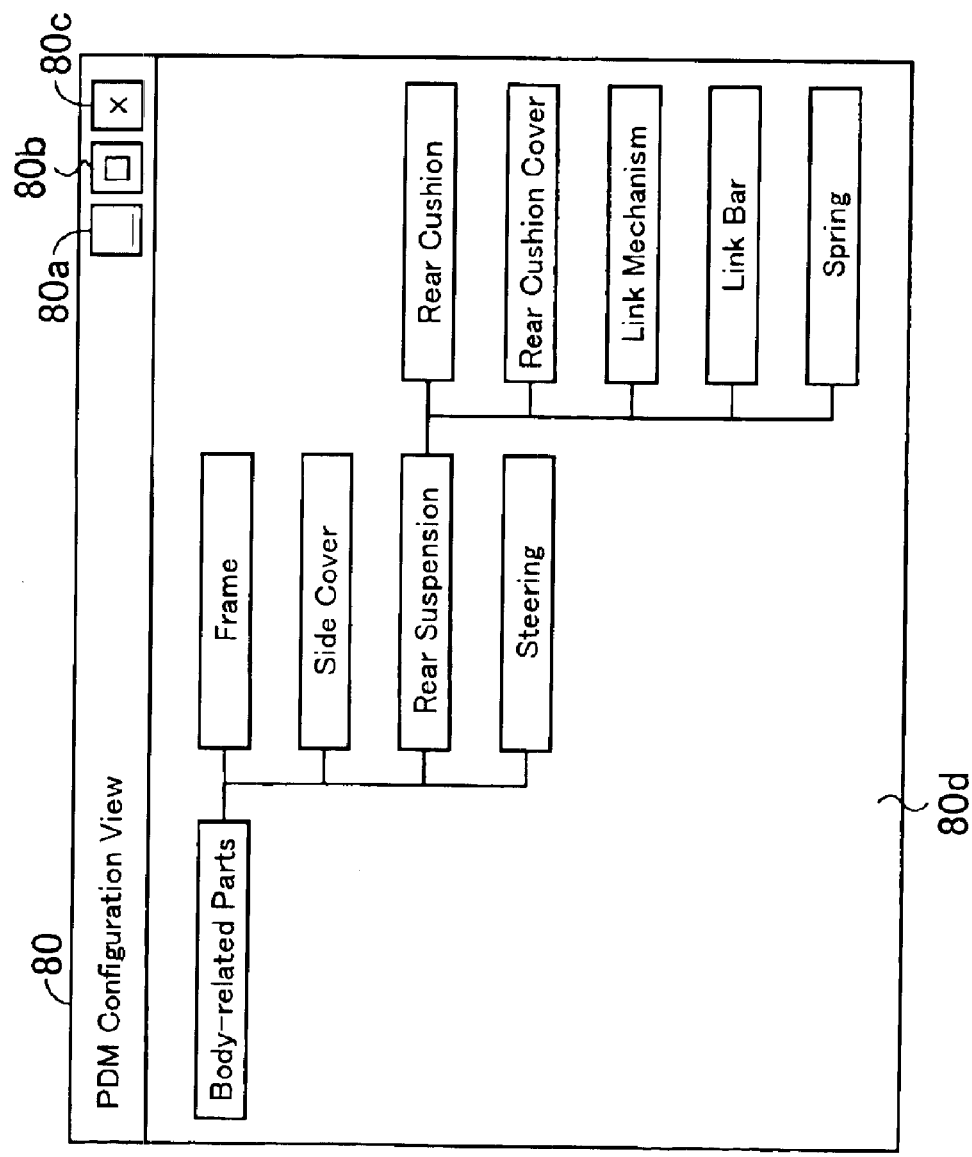
FIG. 23 is a diagram showing an example of how the PDM configuration view screen looks after rear suspension is specified in the example shown in FIG. 22.

In this example, a screen as shown in FIG. 23 is displayed. As illustrated, "Rear Cushion", "Rear Cushion Cover", "Link Mechanism", "Link Bar" and "Spring", appearing in FIG. 22, are rearranged at an identical hierarchical level and linked under "Rear Suspension".

[S64] The CPU 10a registers part data on the thus-linked parts anew in the attribute DB 14. The part data is attribute information indicating attributes of the individual parts included in the PDM configuration view.

An example of such part data is shown in FIG. 24. The part data shown in this example is one associated with "Link Bar" appearing in FIG. 23. As illustrated in the figure, the part data includes "Part Name" indicating the name of the part, "Part No." indicating the management number of the part, "Author" indicating the name of a person who created the CAD data, "Creation Date" indicating the date of creation of the data, "Reviser" indicating the name of a person who updated the data, "Last Update Date" indicating the date in which the data was last updated, "Link Type" indicating the type of link, "Storage Location" indicating the location where the data is stored, "Internal Part Name" indicating the part name used within the three-dimensional CAD, "Material" indicating the material of the part, "Surface" indicating surface condition, and "Facet Error" indicating an allowable error for the generation of facet data (described in detail later).

Specifically, "Link Bar" is set as the part name, "L15-12" as the part number, "Toru NAKAMOTO" as the author, "99/12/10" as the creation date, "Kaoru TAKADA" as the reviser, "99/12/21" as the last update date, "Flat" as the link type, "A:/DATA" as the storage location, "LNK-12." as the internal part name, "Aluminum" as the material, the number "11" as the surface, and "$10^{-6}$" as the facet error. "Flat", which is stored as the link type, indicates that "Link Bar" is correlated by means of flat link. For ordinary correlation other than the flat link, "Dynamic" is stored, and in the case of the multi-link described later, "Multi" is stored.

According to the process described above, a hierarchical structure that is generated just for the sake of convenience of operation on three-dimensional CAD can be altered according to the hierarchical structure which the actual parts have and can be correlated with the PDM configuration view.

Figure 25:
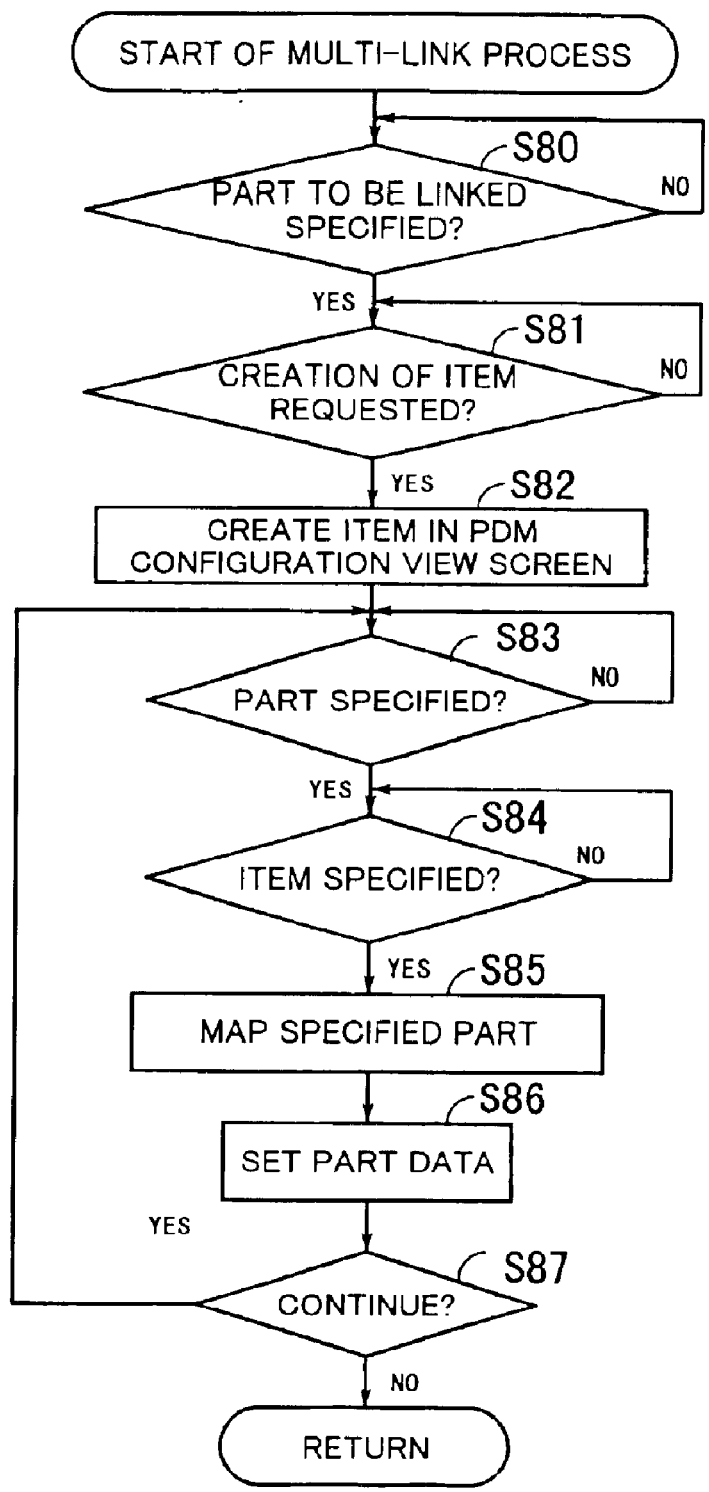
FIG. 25 is a flowchart showing details of a "multi-link process" appearing in FIG. 19.
Figure 26:
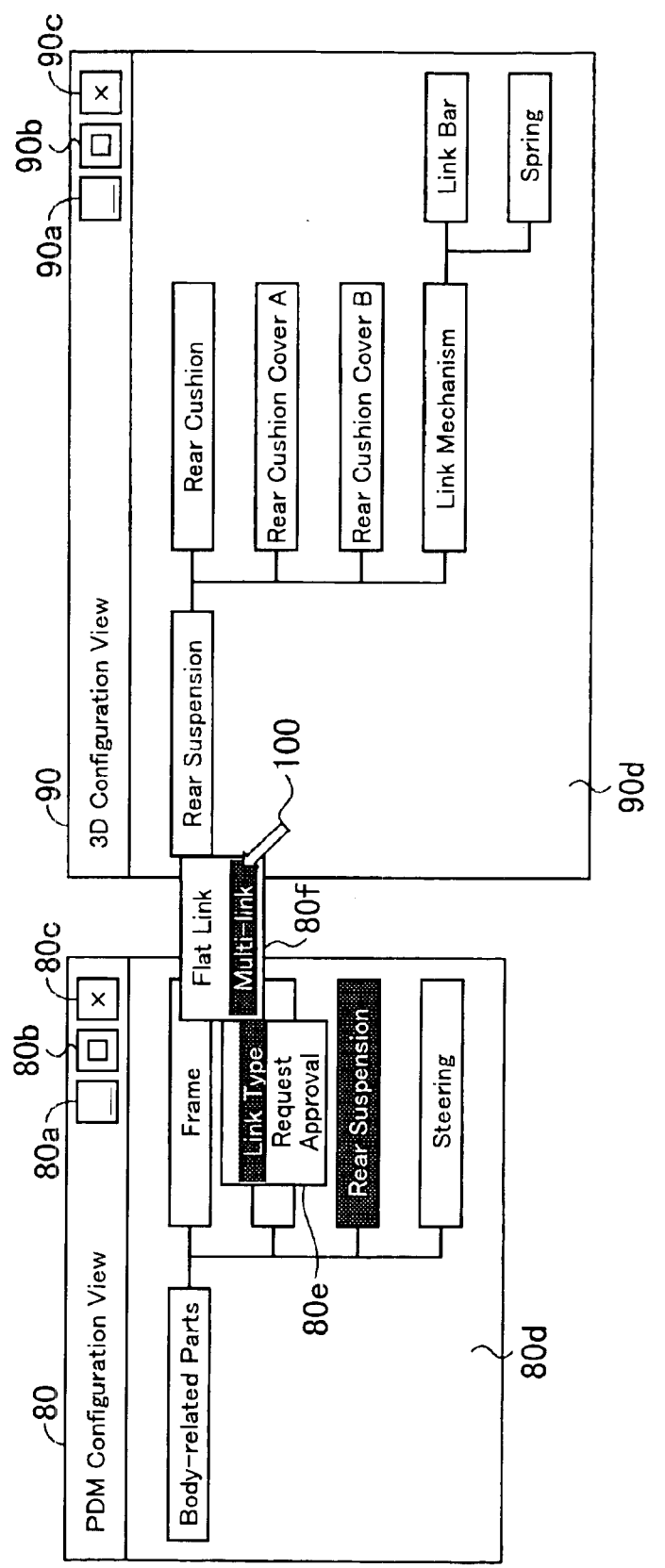
FIG. 26 is a diagram showing an example of display wherein, in the PDM configuration view screen, rear suspension is right-clicked and link type is selected in the pop-up menu during execution of the process shown in FIG. 19.

Referring now to FIG. 25, the "multi-link process" appearing in FIG. 19 will be described in detail. In the process shown in the flowchart, parts which actually constitute a single part but are drawn as separate parts are unified into one part and linked to the PDM configuration view. The process shown in the flowchart is executed upon selection of "Multi-link" in the pop-up menu 80f, as shown in FIG. 26, which menu is displayed on selection of "Link Type" in the pop-up menu 80e displayed when a certain item is selected and right-clicked in the PDM configuration view screen. Upon start of the process, the following steps are executed.

[S80] The CPU 10a determines whether or not a target of link has been specified in the 3D configuration view screen. If a target of link has been specified, the flow proceeds to Step S81; if not, the flow returns and repeats Step S80.

If, in the 3D configuration view screen shown in FIG. 26, "Rear Suspension" is selected with the cursor 100 as the target of link, for example, the flow proceeds to Step S81.

[S81] If a request to create a new item is made in the PDM configuration view screen, the CPU 10a executes Step S82; if not, the flow returns and repeats Step S81.

For example, if a request is made to create a new item under "Rear Suspension" in the screen shown in FIG. 26 (e.g., "Create New Item" is selected in a pop-up menu, not shown), the flow proceeds to Step S82.

[S82] The CPU 10a performs a process of creating a new item in the PDM configuration view screen.

Figure 27:
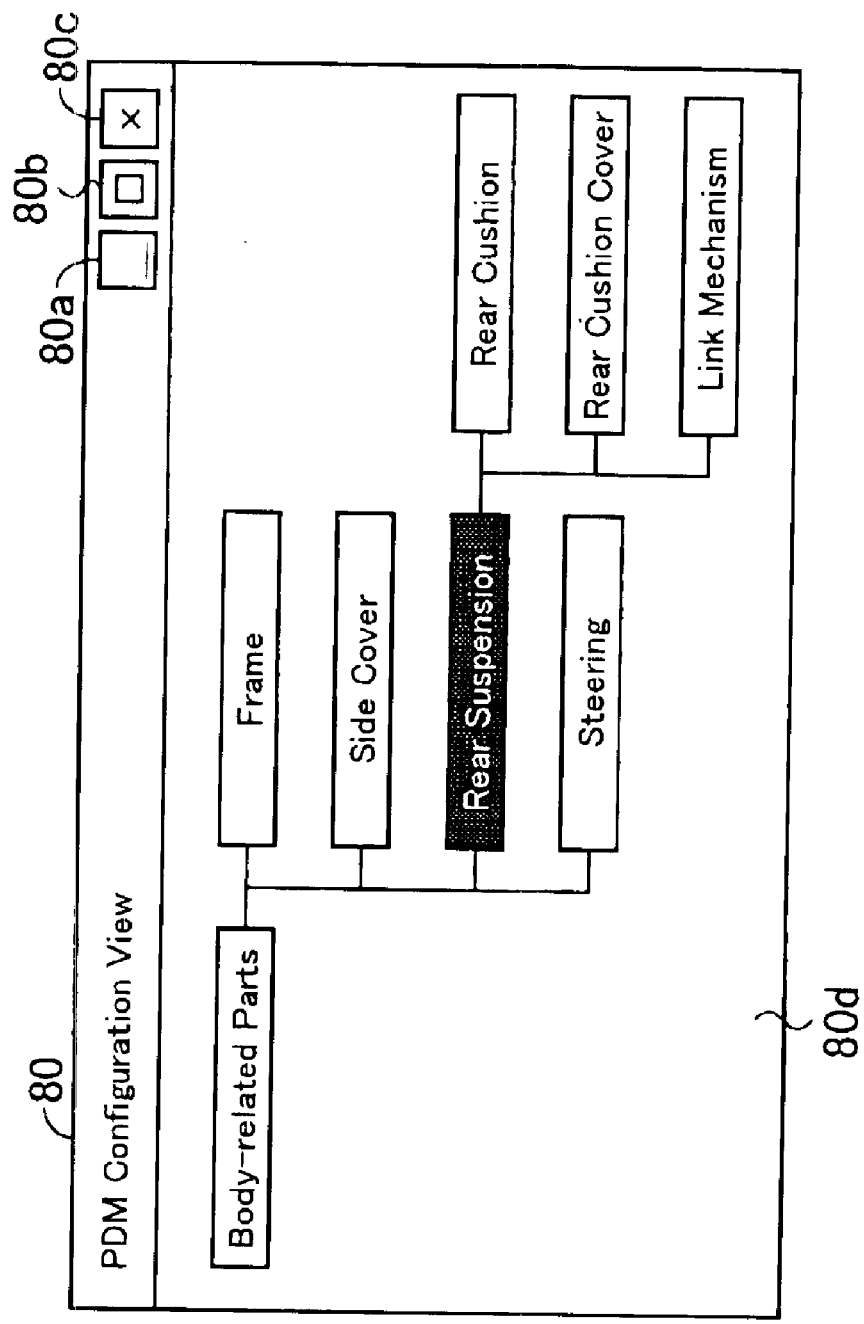
FIG. 27 is a diagram showing the PDM configuration view screen in which new items are created under rear suspension.

As shown in FIG. 27, for example, a process of creating new items "Rear Cushion", "Rear Cushion Cover" and "Link Mechanism" under "Rear Suspension" is executed.

[S83] If parts to be linked are specified in the 3D configuration view screen, the CPU 10a executes Step S84; if not, the flow returns and repeats Step S83.

Figure 28:
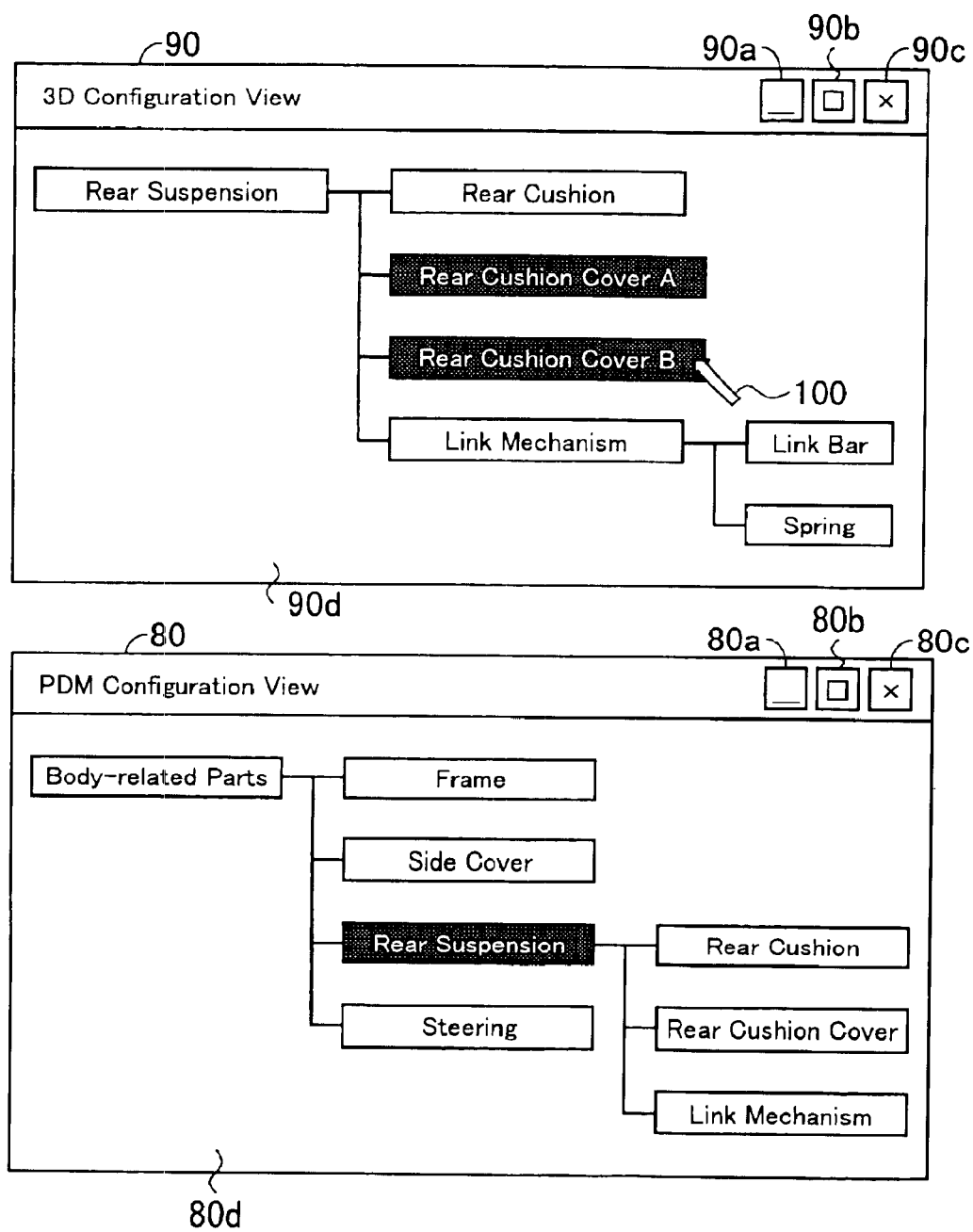
FIG. 28 is a diagram showing an example of display wherein, in the 3D configuration view screen, rear cushion covers A and B are selected as parts to be linked.

If, for example, "Rear Cushion Cover A" and "Rear Cushion Cover B" are specified in the 3D configuration view screen, as shown in FIG. 28, the flow proceeds to Step S84. "Rear Cushion Cover A" and "Rear Cushion Cover B" are parts which actually constitute one part but were created as two separate parts for purposes of the convenience of drawing by CAD. For example, the rear cushion covers A and B are symmetrical parts and were created by first creating the rear cushion cover A and then the rear cushion cover B by inverting a copy of the cover A.

[S84] If a certain item has been specified in the PDM configuration view screen as a target of link, the CPU 10a executes Step S85; if not, the flow returns and repeats Step S84.

[S85] The CPU 10a maps the parts specified in the 3D configuration view screen, into the PDM configuration view screen.

Figure 29:
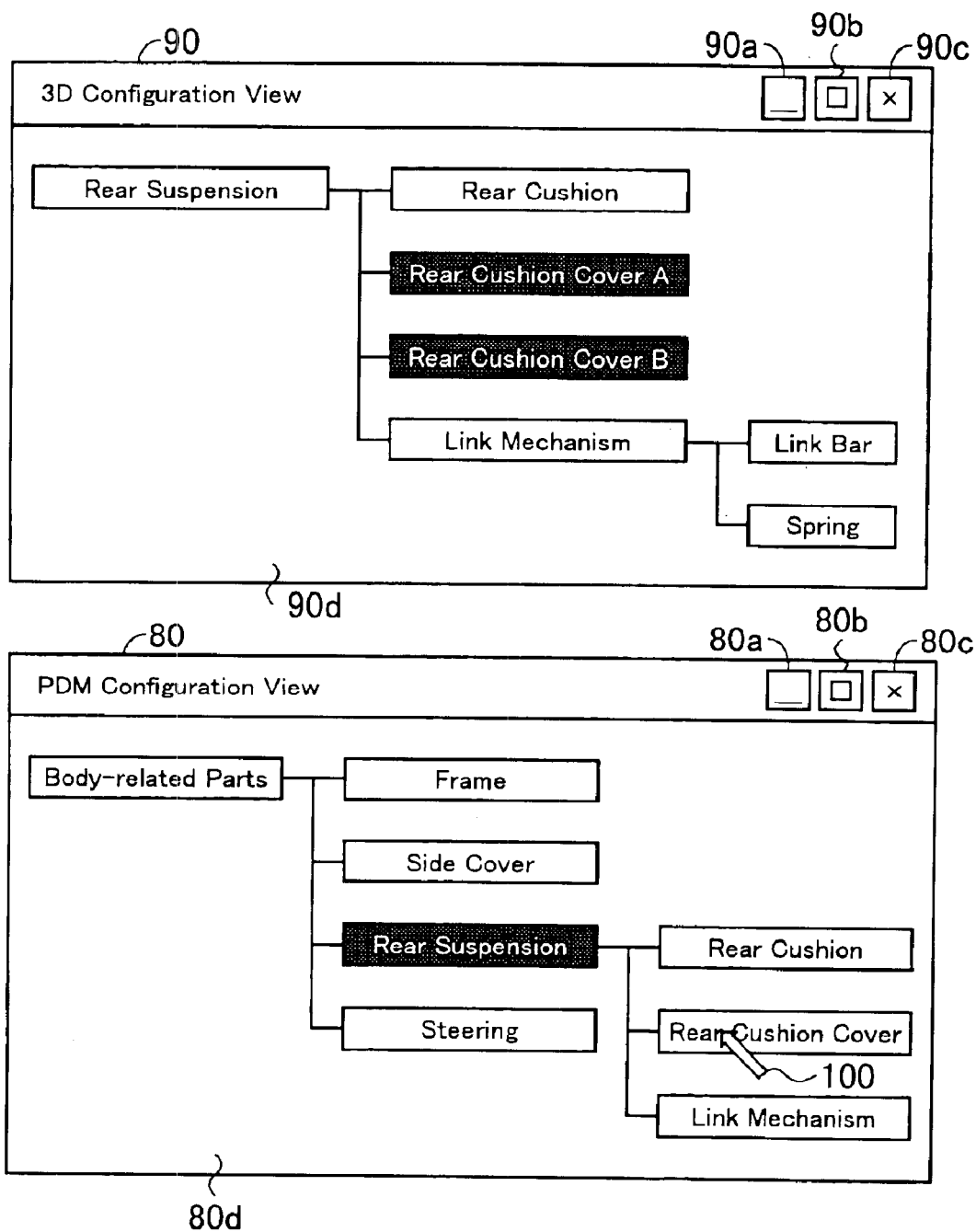
FIG. 29 is a diagram showing an example of display wherein rear cushion cover is selected as a target to which rear cushion covers A and B are to be linked.

In the above example, if "Rear Cushion Cover" in the PDM configuration view screen, for example, is selected with the cursor 100 as the target to which the rear cushion covers A and B are to be linked, as shown in FIG. 29, the rear cushion covers A and B are mapped into the PDM configuration view screen in association with "Rear Cushion Cover".

[S86] The CPU 10a registers part data on the thus-linked parts anew in the attribute DB 14.

In this example, part data as shown in FIG. 30 is registered anew in the attribute DB 14.

In the illustrated example, "Multi" is set as the link type, indicating that the parts concerned are linked by means of multi-link. Also, as seen from the inclusion of two sets of the items "Storage Location" through "Surface", the attribute information about the two parts, that is, the rear cushion covers A and B, is stored in a unified manner. Further, the part name "Rear Cushion Cover" is assigned to the unification of the two parts.

[S87] The CPU 10a determines whether to continue the process or not. If the process is to be continued, the flow returns to Step S83 to repeat the aforementioned process; if not, the process is ended.

Figure 31:
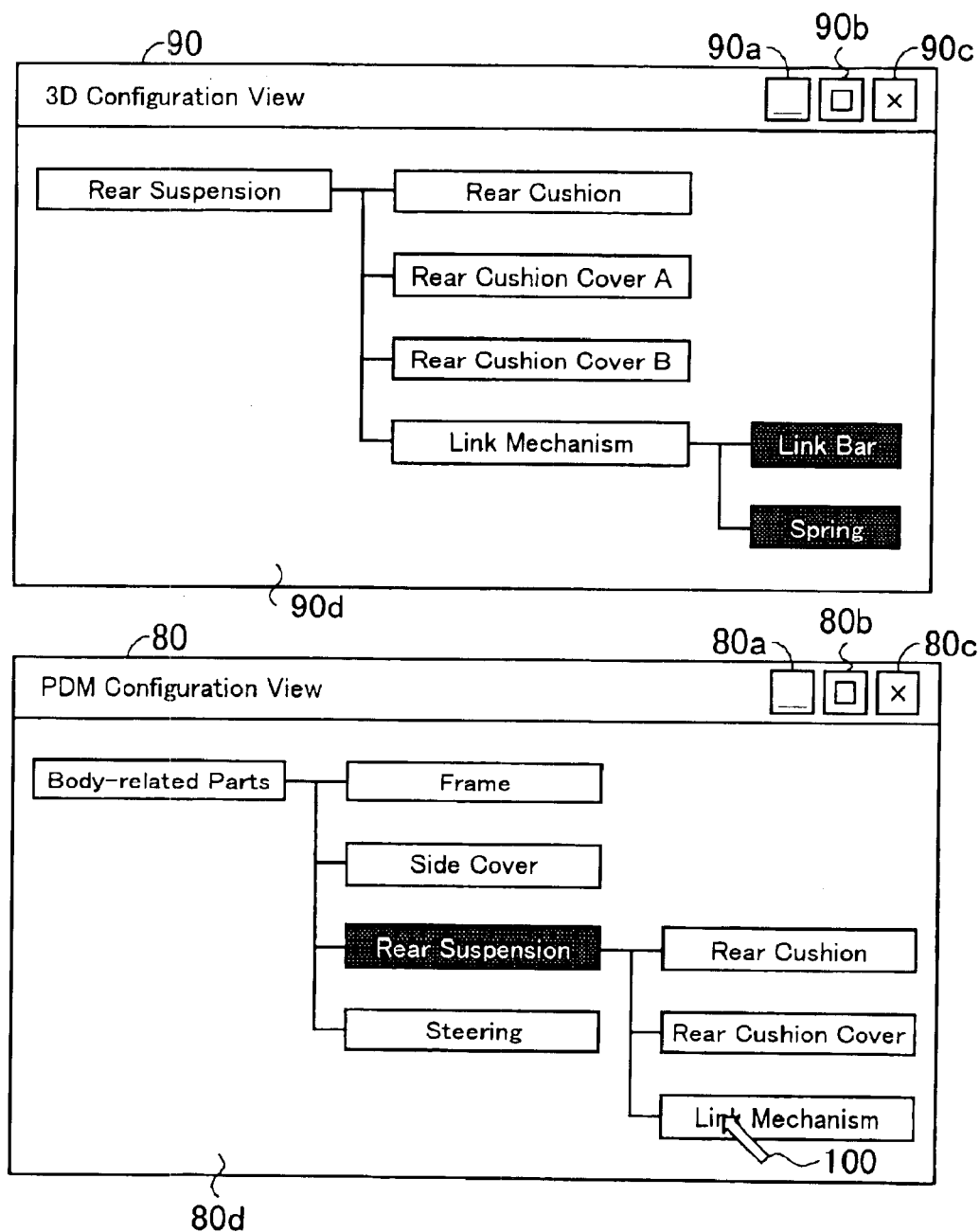
FIG. 31 is a diagram showing an example of display wherein link bar and spring are linked to link mechanism in the PDM configuration view screen.

For example, assuming that the process is continued, if the parts "Link Bar" and "Spring" are specified in the 3D configuration view screen and then the item "Link Mechanism" is specified with the cursor 100 as the target of link, as shown in FIG. 31, the link bar and the spring are correlated with the link mechanism and part data including these two parts is created.

According to the process described above, even in cases where parts which actually constitute a single part are created separately for purposes of the convenience of operation on three-dimensional CAD, they can be correlated as a single part with the PDM configuration view screen. Also, in this case, the parts included in the individual items shown in the PDM configuration view screen can be identified by making reference to the part data.

A process of generating facet data will be now described. After the creation of a three-dimensional model is completed, it is necessary that the finished three-dimensional model be presented for view to a supervisor or the like to obtain his/her approval. The supervisor's terminal unit may not have a three-dimensional CAD application program installed therein, and it is therefore desirable that the three-dimensional model be viewed without such an application program. Accordingly, in this embodiment, the three-dimensional model is converted to facet data composed of polygons and texture so that it can be viewed with ease. In the following, a process of generating facet data from the part for which approval is requested will be described with reference to FIG. 32.

Figure 32:
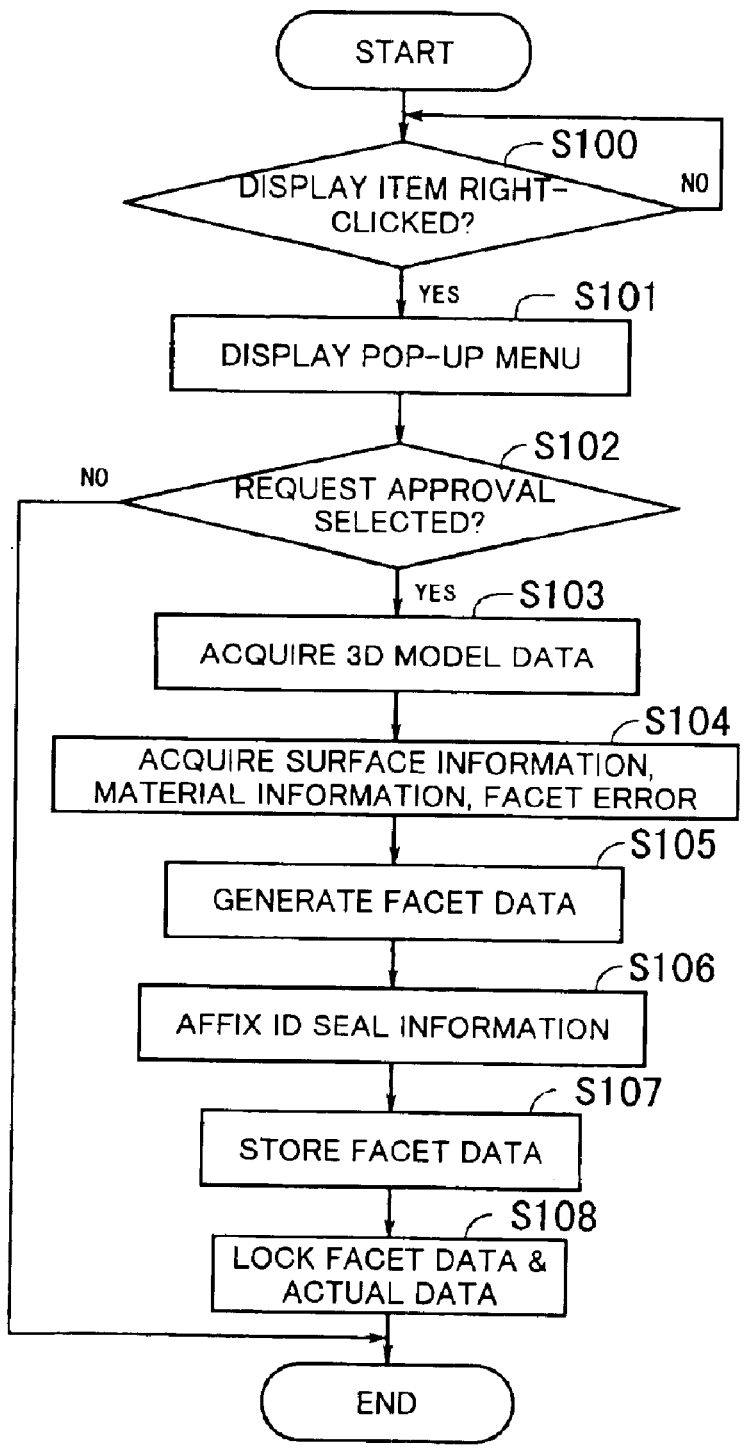
FIG. 32 is a flowchart showing an example of a facet data generation process.

Upon start of the process shown in the flowchart of FIG. 32, the following steps are executed.

If a certain item is selected in the PDM configuration view screen, the CPU 10a executes Step S101; if not, the flow returns and repeats Step S100.

Figure 33:
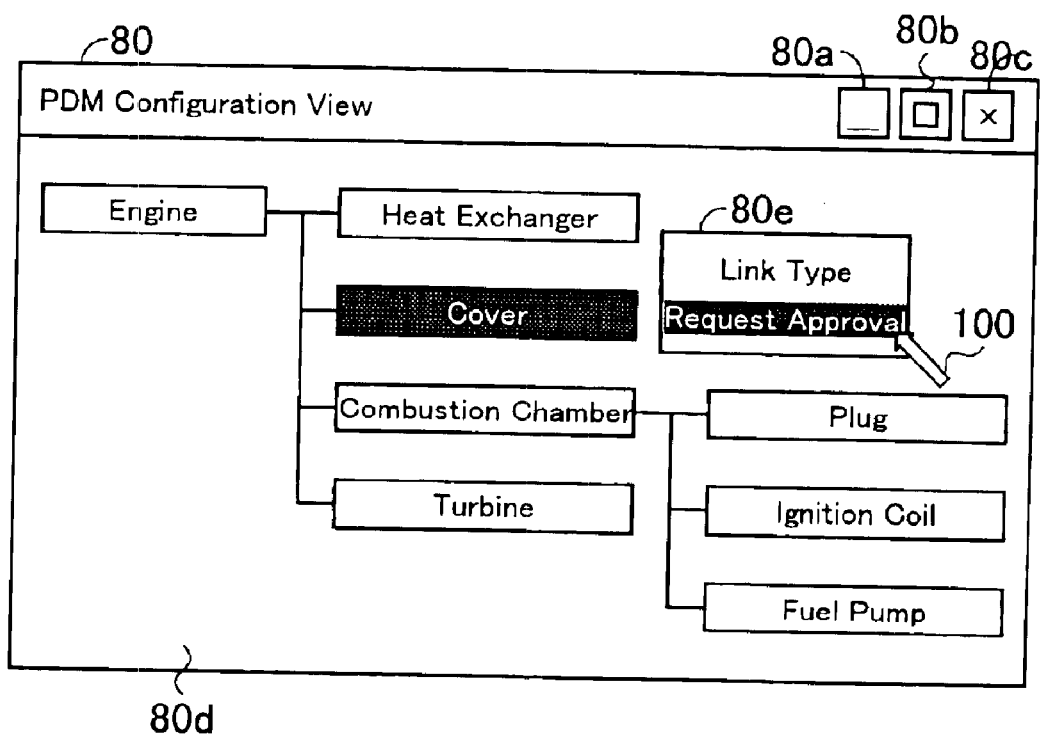
FIG. 33 is a diagram showing an example of display wherein "Cover" is right-clicked in the PDM configuration view screen.

If "Cover", for example, is selected in the PDM configuration view screen shown in FIG. 33, the flow proceeds to Step S101.

[S101] The CPU 10a has a pop-up menu displayed on screen.

In this example, the pop-up menu 80e is displayed near the selected item "Cover".

[S102] If "Request Approval" is selected in the pop-up menu 80e, the CPU 10a executes Step S103; if not, the process is ended.

If, in the pop-up menu 80e, "Request Approval" is selected, the flow proceeds to Step S103.

[S103] The CPU 10a acquires actual data of the corresponding three-dimensional model from the bulk DB 13. Specifically, the CPU 10a acquires the part data (cf. FIG. 24) corresponding to the selected item from the attribute DB 14, and identifies the storage location and filename of the actual data of the corresponding three-dimensional model. Subsequently, the CPU acquires the actual data of the target three-dimensional model from the bulk DB 13.

In this example, first, the part data associated with "Cover" is acquired from the attribute DB 14, and then the actual data of the corresponding three-dimensional model is acquired from the bulk DB 13.

[S104] The CPU 10a acquires the surface information, material information and facet error included in the part data.

[S105] The CPU 10a converts the acquired actual data to facet data.

This conversion process can be carried out by dividing the three-dimensional model into a plurality of polygonal regions by making reference to the facet error, and applying to each polygonal region a texture conforming to the surface information and the material information.

[S106] The CPU 10a generates identification seal information and affixes the generated information to the facet data generated in Step S105. The identification seal information is data composed of the name of a person in charge and a date.

[S107] The CPU 10a sends the generated facet data to the bulk DB 13 to be stored therein.

[S108] The CPU 10a locks the generated facet data and the actual data for which approval has been requested, so that the data may not be altered.

Figure 34:
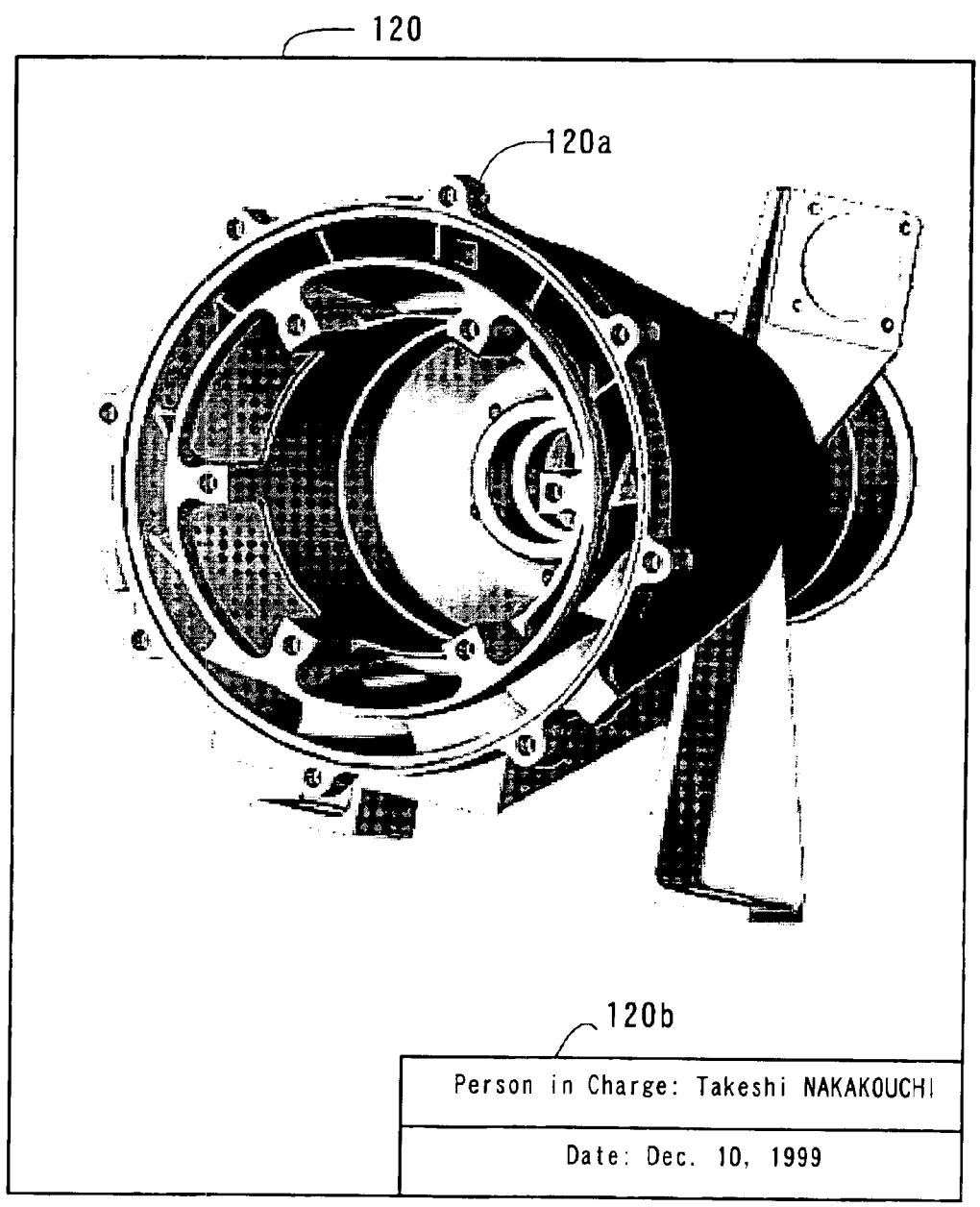
FIG. 34 is a diagram showing an example of facet data generated by the process shown in the flowchart of FIG. 32.
Figure 35:
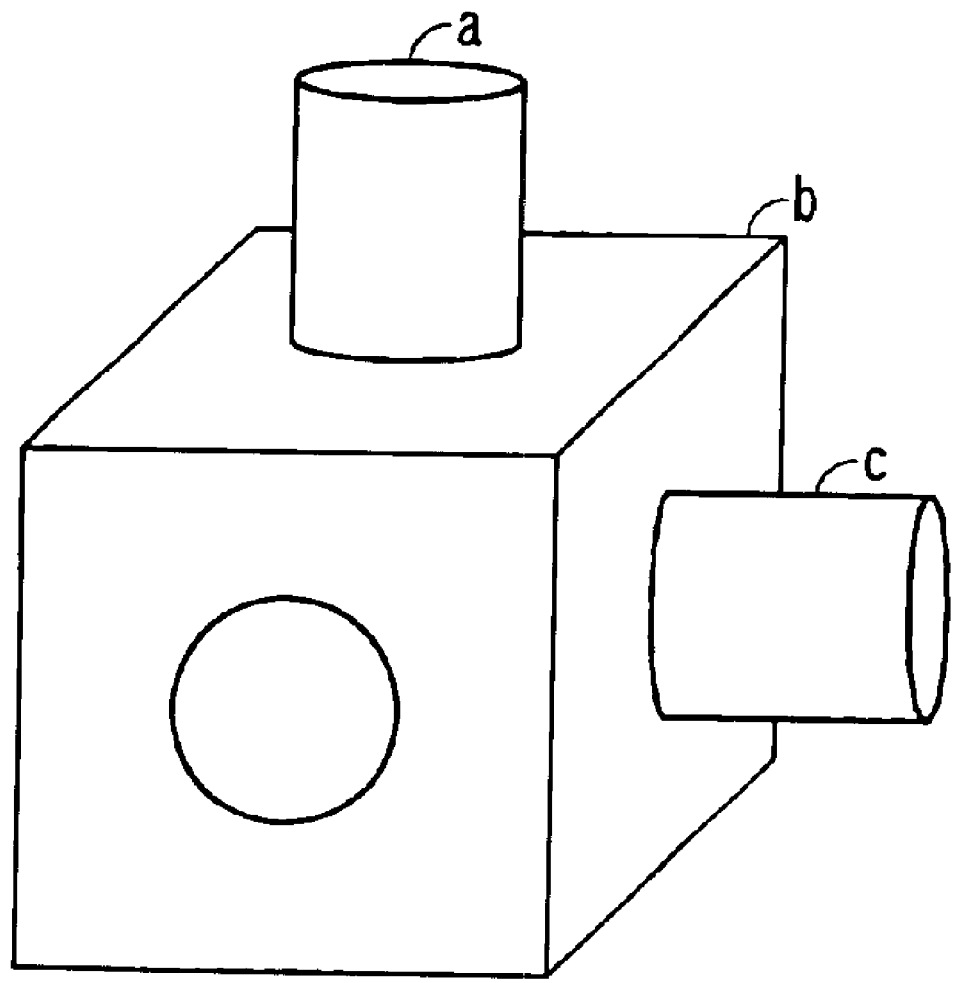
FIG. 35 is a diagram illustrating a hierarchical structure specific to three-dimensional CAD.
Figure 36:
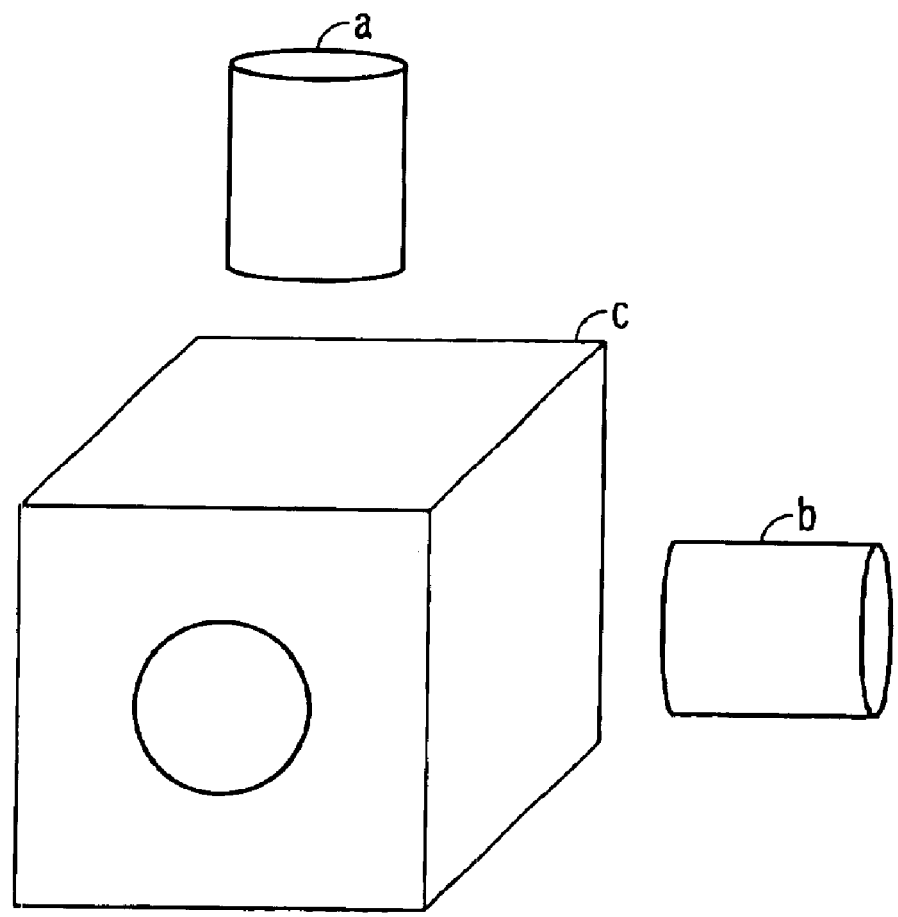
FIG. 36 is a diagram showing a state in which a model shown in FIG. 35 is taken apart.

FIG. 34 shows an example of the facet data generated by the aforementioned process. In the example illustrated in the figure, facet data 120a showing the part "Cover" is displayed at the center of a drawing 120, and the identification seal information showing the name of a person in charge and the date is affixed to the lower right corner of the drawing.

Since the facet data is composed of polygons and texture, it is possible to create a suitable drawing of the part as viewed from any desired direction.

According to the embodiment described above, a three-dimensional model generated by three-dimensional CAD can be presented for view with ease.

In the foregoing embodiment, explanation is made of the case where parts shown in the 3D configuration view screen are correlated with the PDM configuration view screen, by way of example. Alternatively, alteration of the hierarchical structure may be instructed when the 3D configuration view screen is to be displayed, so that the 3D configuration view screen may be shown in accordance with the instruction.

The above-described processing functions can be performed by a computer. In this case, the contents of the functions to be accomplished by the three-dimensional model management system are described in a program recorded in a computer-readable recording medium. By executing the program by a computer, it is possible to perform the above-described processing. The computer-readable recording medium includes magnetic recording device, semiconductor memory and the like. To distribute the program to the market, the program may be stored in portable recording media such as CD-ROMs (Compact Disk Read Only Memories) or floppy disks. Alternatively, the program may be stored in a storage device of a computer connected to a network and may be transferred to other computers through the network. To execute the program by a computer, the program stored in a hard disk unit or the like of the computer is loaded into the main memory and executed.

As described above, according to the present invention, a three-dimensional model management system for managing a three-dimensional model in which relationship of subordination of individual parts is represented by a hierarchical structure comprises attribute information acquiring means for acquiring attribute information of individual parts constituting the three-dimensional model, sorting means for sorting the attribute information acquired by the attribute information acquiring means in accordance with the hierarchical structure, display form setting means for setting a display form in which the attribute information is to be output for display, editing means for editing the attribute information sorted by the sorting means, in accordance with settings by the display form setting means, and output means for outputting the attribute information edited by the editing means to a display device. It is therefore possible to display a configuration view screen showing a near-real configuration, without being influenced by a hierarchical structure etc. peculiar to a three-dimensional model generated by three-dimensional CAD.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A three-dimensional model management system for managing a three-dimensional model in which relationship of subordination of individual parts is represented by a hierarchical structure, comprising:

attribute information acquiring means for acquiring part name defined in a computer-aided design system and hierarchical structure information of individual three-dimensional parts constituting the three-dimensional model expressing combination structure of each part including three-dimensional part specific to the computer-aided design system;

sorting means for sorting the part name information acquired by said attribute information acquiring means in accordance with the hierarchical structure;

display form setting means for displaying the part name information;

editing means for editing the part name information sorted by said sorting means, in accordance with settings by said display form setting means; and output means for outputting the part name information edited by said editing means to a display device.

2. The three-dimensional model management system according to claim 1, wherein said editing means excludes acquired information of a predetermined part such that the predetermined part is not displayed on a display screen of the display device.

3. The three-dimensional model management system according to claim 1, further comprising classifying means for classifying the information acquired by said attribute information acquiring means according to attributes, wherein said editing means refers to a result of classification by said classifying means and excludes part name information of a part having a predetermined attribute such that said part is not displayed on a display screen of the display device.

4. The three-dimensional model management system according to claim 1, wherein said editing means rearranges part name information of a part at a lower hierarchical level than a predetermined hierarchical level in the hierarchical structure of the three-dimensional model such that said part belongs to the predetermined hierarchical level.

5. The three-dimensional model management system according to claim 1, further comprising redefining means for redefining, as a single part, a group of parts which are defined in the three-dimensional model as a plurality of parts, and for generating a new part name information on the redefined part.

6. The three-dimensional model management system according to claim 5, wherein said redefining means redefines a predetermined part to which a plurality of parts are subordinate at a lower hierarchical level, as a single part including said plurality of parts, and generates a new part name information on the redefined part.

7. The three-dimensional model management system according to claim 1, further comprising specifying means for specifying predetermined part name information displayed by the display device, three-dimensional data acquiring means for acquiring, from the three-dimensional model, three-dimensional data corresponding to the part name information specified by said specifying means, and facet data generating means for generating facet data, which is surface data for display, from the three-dimensional data acquired by said three-dimensional data acquiring means.

8. The three-dimensional model management system according to claim 7, further comprising identification information affixing means for affixing identification information indicative of normal creation to the facet data generated by said facet data generating means.

9. A computer-readable recording medium recording a program for causing a computer to manage a three-dimensional model in which relationship of subordination of individual parts is represented by a hierarchical structure, wherein the program causes the computer to function as attribute information acquiring means for acquiring a part name defined in computer-aided design system and hierarchical structure information of individual three-dimensional parts constituting the three-dimensional model expressing combination structure of each part including three-dimensional part specific to the computer-aided design system, sorting means for sorting the information acquired by the attribute information acquiring means in accordance with the hierarchical structure, display form setting means for displaying the attribute information;

editing means for editing the information sorted by the sorting means, in accordance with settings by the display form setting means, and output means for outputting the attribute information edited by the editing means to a display device.

10. A computer-readable recording medium according to claim 9, wherein the part name information and the model are stored separately.

11. The three-dimensional model management system according to claim 1, wherein the part name information and the model are stored separately.

12. A method for managing a three-dimensional model in which relationship of subordination of individual parts of the model are represented by a hierarchical structure, comprising:

acquiring a part name defined in computer-aided design system and hierarchical information of individual three-dimensional parts constituting the three-dimensional model expressing combination structure of each part including three-dimensional part specific to the computer-aided design system, sorting the information acquired by said attribute information acquiring means in accordance with stored hierarchical structure;

displaying a display form in which the part name information is displayed;

editing the information sorted by said sorting means, in accordance with settings by said display form setting means; and outputting the information edited by said editing means to a display device.

13. A system for managing a three-dimensional model, comprising:

an information acquiring device acquiring a part name defined in a computer-aided design system and hierarchical structure information of individual three-dimensional parts constituting the three-dimensional model expressing combination structure of each part including three-dimensional part specific to the computer-aided design system;

a sorting device sorting the information acquired by said information acquiring device in accordance with the hierarchical structure;

a display device to display the part name information;

an editing device to edit the information sorted by the sorting device upon input to the form setting display device; and an output device outputting the information edited by the editing device.

14. The method according to claim 12, wherein the acquired information includes author and creation information of individual three-dimensional parts.

15. A method for managing individual parts of a three-dimensional model in a computer-aided design system, comprising:

obtaining information in relation to individual three-dimensional parts defined by a computer-aided design system and hierarchical information expressing combination structure of each part including three-dimensional part specific to the computer-aided design system, sorting the obtained information in accordance with stored hierarchical structure;

displaying a display form in which the information in relation to individual three-dimensional parts defined by a computer-aided design system is displayed;

editing the sorted information in accordance with settings by the display form and producing edited information; and outputting the edited information to a display device.

* * * * *

UNITED STATES PATENT AND TRADEMARK OFFICE
CERTIFICATE OF CORRECTION

PATENT NO. : 6,885,367 B1
DATED : April 26, 2005
INVENTOR(S) : Makoto Fujieda

It is certified that error appears in the above-identified patent and that said Letters Patent is hereby corrected as shown below:

<u>Column 17,</u>
Line 28, delete "attribute".

Signed and Sealed this

Twenty-first Day of March, 2006

JON W. DUDAS
*Director of the United States Patent and Trademark Office*